United States Patent [19]
Miyamoto et al.

[11] Patent Number: 6,084,725
[45] Date of Patent: Jul. 4, 2000

[54] NONCIRCULAR LENS POSITIONING STRUCTURE AND ITS METHOD

[75] Inventors: Masaru Miyamoto; Tamotsu Kume; Hideki Nagata, all of Sakai, Japan

[73] Assignee: Minolta Company, Ltd., Osaka, Japan

[21] Appl. No.: 09/472,240

[22] Filed: Dec. 27, 1999

Related U.S. Application Data

[62] Division of application No. 08/844,106, Apr. 28, 1997.

[30] Foreign Application Priority Data

| Apr. 30, 1996 | [JP] | Japan | 8-109466 |
| Apr. 30, 1996 | [JP] | Japan | 8-109725 |
| Apr. 30, 1996 | [JP] | Japan | 8-109727 |

[51] Int. Cl.$^7$ ..................................................... G02B 7/02
[52] U.S. Cl. ............................................................ 359/819
[58] Field of Search ................................. 359/811, 817, 359/819, 822; 353/100; 362/455; 396/529

[56] References Cited

U.S. PATENT DOCUMENTS

| 2,056,693 | 10/1936 | Stanley | 359/802 |
| 2,166,988 | 1/1939 | Fosdick | 359/711 |
| 4,923,282 | 5/1990 | Spitzberg | 359/819 |
| 4,929,056 | 5/1990 | Leib et al. | 359/819 |
| 5,189,546 | 2/1993 | Iizuka | 359/217 |
| 5,220,460 | 6/1993 | Bedzyk | 359/813 |
| 5,600,495 | 2/1997 | Sekikawa | 359/819 |

FOREIGN PATENT DOCUMENTS

9-297253  11/1997  Japan .

*Primary Examiner*—Ricky Mack
*Attorney, Agent, or Firm*—McDermott, Will & Emery

[57] ABSTRACT

A structure for positioning a plurality of noncircular lenses relative to a lens holding frame which holds the noncircular lenses precisely. The structure includes a first lens frame which holds a first noncircular lens, and a second lens frame which holds a second noncircular lens. A first coupling part of the first lens frame has a first connecting surface which is perpendicular to a centering axis of the first noncircular lens, and a second coupling part of the second lens frame has a second connecting surface, contacting with the first connecting surface, which is perpendicular to the centering axis of the first noncircular lens. When the first coupling part is connected to the second coupling part, they are prevented from rotating relative to each other around the centering axis which is perpendicular to both the first and second connecting surfaces, by a mechanism which prevents a mutual rotation between the first coupling part and the second coupling part of the lens frame.

6 Claims, 18 Drawing Sheets

NONCIRCULAR LENS POSITIONING STRUCTURE AND ITS METHOD

This is a divisional of application Ser. No. 08/844,106, filed Apr. 28, 1997.

BACKGROUND OF THE INVENTION

1. Field of the Invention

The present invention generally relates to a lens positioning structure and its method, particularly relates to a noncircular lens positioning structure and its method, and more particularly relates to the structure and method for making a plurality of centering axes of the noncircular lenses coincide with each other or incline to each other by a predetermined amount or shift to each other by a predetermined distance therebetween, and to the structure and its method for positioning the noncircular lens relative to its lens holding frame.

2. Description of the Related Arts

In case that a lens block including a noncircular lens and its lens holding frame is optically arranged with respect to another lens block including another noncircular lens and its lens holding frame so that a centering axis of the former lens does not coincide with a centering axis of the latter lens in an optical system, there have not been established any favorable techniques for coupling the lens blocks, which hold the noncircular lenses, with each other in a state, for example, that the centering axes of the noncircular lenses held by the lens holding frames are inclined to each other.

The noncircular lens is defined to be a lens which is not perfectly circular in circumferential profile and is not symmetrical with respect to its centering axis.

There have not been provided any conventional techniques in which such a noncircular lens is mounted on the lens holding frame.

In particular, when the centering axes of noncircular lenses are not coincident with each other, i.e., when the lenses are decentered lenses, the direction in which the optical path is refracted by the lens is not symmetrical with respect to the centering axis. Therefore, a rotation of the lens about the centering axis causes the optical path to change, making it impossible to construct an expected optical system.

Also, when a light flux restricting member, or so-called a stop (i.e. aperture, or diaphragm), that determines the effective optical path area between the noncircular lenses, is interposed therebetween, it is difficult to place the light flux restricting member between the lens blocks the centering axes of which are inclined to each other.

On the other hand, in a structure in which a lens having a circular periphery is held by the lens holding frame, the lens is held by a ring-shaped structure that fits to the entire periphery of the lens. Therefore, the lens is positioned relative to the frame with a high accuracy, i.e. a parallel shift in which a centering axis of one lens, and a centering axis of another lens, shift in parallel to each other in a direction perpendicular to a direction in which the centering axis exist, or an inclination in which a centering axis of one lens inclines with respect to a centering axis of another lens, is effectively prevented.

Also, a cut lens, a kind of noncircular lens, which is so shaped that a peripheral portion thereof is cut in parallel with the centering axis thereof, is positioned relative to its lens holding frame in which the outer peripheral portion of the cut lens is engaged with the inner peripheral portion of the lens holding frame over the mutual entire peripheries.

The lens holding frame with the entire-periphery fitting structure for a circular lens is not so difficult to manufacture due to the relatively simple construction. On the other hand, the entire-periphery fitting structure for the noncircular lens makes the structure itself of the lens frame complex and makes it difficult to position and hold the lens with respect to the lens holding frame accurately.

Further, there has not been established a technique for holding a plurality of noncircular lenses relative to their lens holding frame so that their respective centering axes are kept positioned to each other.

SUMMARY OF THE INVENTION

Therefore, it is an object of the present invention to provide a simple structure and a method for precisely positioning the noncircular lens relative to its lens holding frame without using the entire-periphery fitting structure.

It is another object of the present invention to provide a structure and a method for making the plurality of centering axes of the noncircular lenses coincide with each other or shift to each other in a direction perpendicular to a direction in which the centering axes of lenses exist.

It is still another object of the present invention to provide a structure and a method for coupling with each other a plurality of lens holding frames each of which holds a noncircular lens, with centering axes of the noncircular lenses being positively inclined to each other.

In accomplishing this and other objects of the present invention, there is provided a positioning structure comprising: a noncircular lens which has a flat surface around, wherein the flat surface is perpendicular to a centering axis thereof; and a lens frame which holds the noncircular lens, wherein the lens frame has a first contact surface which contacts with the flat surface of the noncircular lens.

According to the positioning structure, the noncircular lens is held by the lens frame by a simple structure in which the flat surface of the noncircular lens is contacted with the first contact surface of the lens frame.

With the positioning structure, an inclination of the noncircular lens relative to the lens frame so that the centering axis of the noncircular lens inclines to its reference centering axis thereof within the lens frame, is prevented; thus, realizing a precise positioning of the noncircular lens relative to the lens frame or the lens holding frame without using the conventional entire-periphery fitting structure.

In accomplishing the above objects, there is also provided a method for positioning a noncircular lens with respect to a lens frame which holds the noncircular lens, wherein the noncircular lens has a flat surface around, wherein the flat surface is perpendicular to a centering axis thereof, and wherein the lens frame has a first contact surface which corresponds to the flat surface of the noncircular lens, the method comprising the step of: contacting the flat surface of the noncircular lens with the first contact surface of the lens frame.

In accomplishing the above objects, there is also provided a positioning structure for positioning a plurality of noncircular lenses relative to a lens frame which holds the noncircular lenses, comprising: a first noncircular lens which has a first circumferential surface which is formed arcuate and parallel with the centering axis, and which has a first planar surface that is formed perpendicular to the centering axis; and a second noncircular lens which has a second circumferential surface which is formed arcuate and parallel with the centering axis, and which has a second planar surface that is formed perpendicular to the centering axis, wherein the lens frame comprises: a first contact surface which contacts with the first circumferential surface of the first noncircular lens; a second contact surface which contacts with the first planar surface of the first noncircular lens; a third contact surface which contacts with the second circumferential surface of the second noncircular lens; and a fourth contact surface which contacts with the second planar surface of the second noncircular lens.

According to the positioning structure:

(1) by contacting the first planar surface of the first noncircular lens with the second contact surface of the lens frame, the inclination of the noncircular lens relative to the lens frame is prevented;
(2) by contacting the first circumferential surface of the first noncircular lens with the first contact surface of the lens frame, the parallel shift of the noncircular lens relative to the lens frame is prevented;
(3) by contacting the second planar surface of the second noncircular lens with the fourth contact surface of the lens frame, the inclination of the second noncircular lens frame relative to the lens frame is prevented; and
(4) by contacting the second circumferential surface of the second noncircular lens with the third contact surface of the lens frame, the parallel shift of the second noncircular lens relative to the lens frame is prevented.

In accomplishing the above objects, there is also provided a method for positioning a plurality of noncircular lenses relative to a lens frame which holds the noncircular lenses, in which the noncircular lenses comprise: a first noncircular lens which has a first circumferential surface which is formed arcuate in a direction perpendicular to a centering axis of the first noncircular lens and is formed parallel with the centering axis, and which has a first planar surface that is formed perpendicular to the centering axis; and a second noncircular lens which has a second circumferential surface which is formed arcuate in a direction perpendicular to a centering axis of the second noncircular lens and is formed parallel with the centering axis, and which has a second planar surface that is formed perpendicular to the centering axis, wherein the lens frame comprises: a first contact surface which corresponds with the first circumferential surface of the first noncircular lens; a second contact surface which corresponds with the first planar surface of the first noncircular lens; a third contact surface which corresponds with the second circumferential surface of the second noncircular lens; and a fourth contact surface which corresponds with the second planar surface of the second noncircular lens, wherein the first noncircular lens comprises a third planar surface which is formed parallel to the centering axis thereof, wherein the third planar surface is formed opposite to the first circumferential surface thereof with a predetermined distance from the centering axis, wherein the second noncircular lens comprises a fourth planar surface which is formed parallel to the centering axis thereof, in which the fourth planar surface is formed opposite to the second circumferential surface thereof with a predetermined distance from the centering axis, wherein the lens frame comprises a fifth contact surface which corresponds with both the third planar surface of the first noncircular lens and the fourth planar surface of the second noncircular lens, wherein the first planar surface of the first noncircular lens extends more than 180 degrees relative to the centering axis thereof, and wherein the first planar surface thereof corresponds with the second contact surface of the lens frame, with the first planar surface and the first circumferential surface of the first noncircular lens engaging with the second contact surface and the first contact surface of the lens frame, respectively, and wherein the method comprises the steps of: contacting the first contact surfaces of the lens frame with the first circumferential surface of the first noncircular lens, and contacting the second contact surface of the lens frame with the first planar surface of the first noncircular lens; contacting the third contact surface of the lens frame with the second circumferential surface of the second noncircular lens, and contacting the fourth contact surface of the lens frame with the second planar surface of the second noncircular lens; and contacting the fifth contact surface of the lens frame with both the third planar surface of the first noncircular lens and the fourth planar surface of the second noncircular lens.

In accomplishing the above object, there is also provided a structure for connecting a plurality of lens frames to each other each of which holds a noncircular lens, comprising: a first lens frame which has a first coupling part with a first connecting surface being perpendicular to a centering axis of a first noncircular lens that is held by the first lens frame; a second lens frame which has a second coupling part with a second connecting surface being perpendicular to the centering axis of the first noncircular lens, in which the first connecting surface and the second connecting surface contact with each other; and, a rotation prohibiting mechanism by which the first coupling part and the second coupling part are prevented from rotating relative to each other around the centering axis which is perpendicular to both the first and second connecting surfaces.

According to the structure, when the first lens frame is connected to the second lens frame, the centering axes of the noncircular lenses held by the first and second lens frames are positively inclined to each other.

In accomplishing the above objects, there is also provided a structure for connecting a plurality of lens frames to each other each of which holds a noncircular lens, comprising: a first lens frame which holds a first noncircular lens with a first centering axis thereof and which has a first edge surface that is perpendicular to the first centering axis; a second lens frame which holds a second noncircular lens with a second centering axis thereof and which has a second edge surface that is perpendicular to the second centering axis; and a spacer, which is provided between the first edge surface of the first lens frame and the second edge surface of the second lens frame, a pair of surfaces, facing the first and second edge surfaces, of which are inclined to each other at a predetermined angle which corresponds to an inclination angle between the first centering axis and the second centering axis, wherein the spacer is so connected between the first lens frame and the second lens frame that the spacer is prevented from rotating relative to the first lens frame around the first centering axis thereof, that the spacer is prevented from rotating relative to the second lens frame around the second centering axis thereof.

In accomplishing the above object, there is also provided a structure for connecting a plurality of lens frames each of which holds a noncircular lens in which a plurality of centering axes of the noncircular lenses are inclined to each other, comprising: a first lens frame which holds a first noncircular lens and which has a first edge surface; and a second lens frame which holds a second noncircular lens and which has a second edge surface, wherein the first edge surface and second edge surface are perpendicular to an optical axis between the first noncircular lens and the second noncircular lens, and wherein there is provided a light flux restricting member between the first edge surface of the first lens frame and the second edge surface of the second lens frame.

In accomplishing the above objects, there is also provided a method for connecting a plurality of lens frames each of which holds a noncircular lens, in which there are provided: a first lens frame which has a first coupling part with a first connecting surface being perpendicular to a centering axis of a first noncircular lens that is held by the first lens frame; and a second lens frame which has a second coupling part with a second connecting surface being perpendicular to the centering axis of the first noncircular lens, the method comprising the step of: connecting the first coupling part and the second coupling part to each other so that the first coupling part and the second coupling part are prevented from rotating relative to each other around the centering axis which is perpendicular to both the first connecting surface and the second connecting surface.

In accomplishing the above objects, there is also provided a method for connecting a plurality of lens frames each of which holds a noncircular lens, in which there are provided: a first lens frame which holds a first noncircular lens with a first centering axis thereof and which has a first edge surface that is perpendicular to the first centering axis; a second lens frame which holds a second noncircular lens with a second centering axis thereof and which has a second edge surface that is perpendicular to the second centering axis; and a spacer a pair of surfaces of which are inclined to each other at a predetermined angle which corresponds to an inclination angle between the first centering axis and the second centering axis, the method comprising the steps of: providing the spacer between the first edge surface of the first lens frame and the second edge surface of the second lens frame so that one of the pair of surfaces thereof faces the first edge surface of the first lens frame, and so that the other of the pair of surfaces thereof faces the second edge surface of the second lens frame; and connecting the one of the pair of surfaces of the spacer to the first edge surface of the first lens frame, and connecting the other of the pair thereof to the second edge surface of the second lens frame, so that the spacer is prevented from rotating relative to the first lens frame around the first centering axis thereof, and so that the spacer is prevented from rotating relative to the second lens frame around the second centering axis thereof.

In accomplishing the above objects, there is also provided a method for connecting a plurality of lens frames to each other each of which holds a noncircular lens in which a plurality of centering axes of the noncircular lenses are inclined to each other, in which there are provided: a first lens frame which holds a first noncircular lens and which has a first edge surface; a second lens frame which holds a second noncircular lens and which has a second edge surface, wherein the first edge surface of the first lens frame and the second edge surface of the second lens frame are perpendicular to an optical axis between the first noncircular lens and the second noncircular lens; and a light flux restricting member, the method comprising the step of: connecting the first edge surface of the first lens frame and the second edge surface of the second lens frame to each other with the light flux restricting member being held between the first edge surface thereof and the second edge surface thereof.

BRIEF DESCRIPTION OF THE DRAWINGS

This and other objects and features of the present invention will become clear from the following description taken in conjunction with the preferred embodiments thereof with reference to the accompanying drawings, in which.

DETAILED DESCRIPTION OF THE INVENTION

Figure 1:
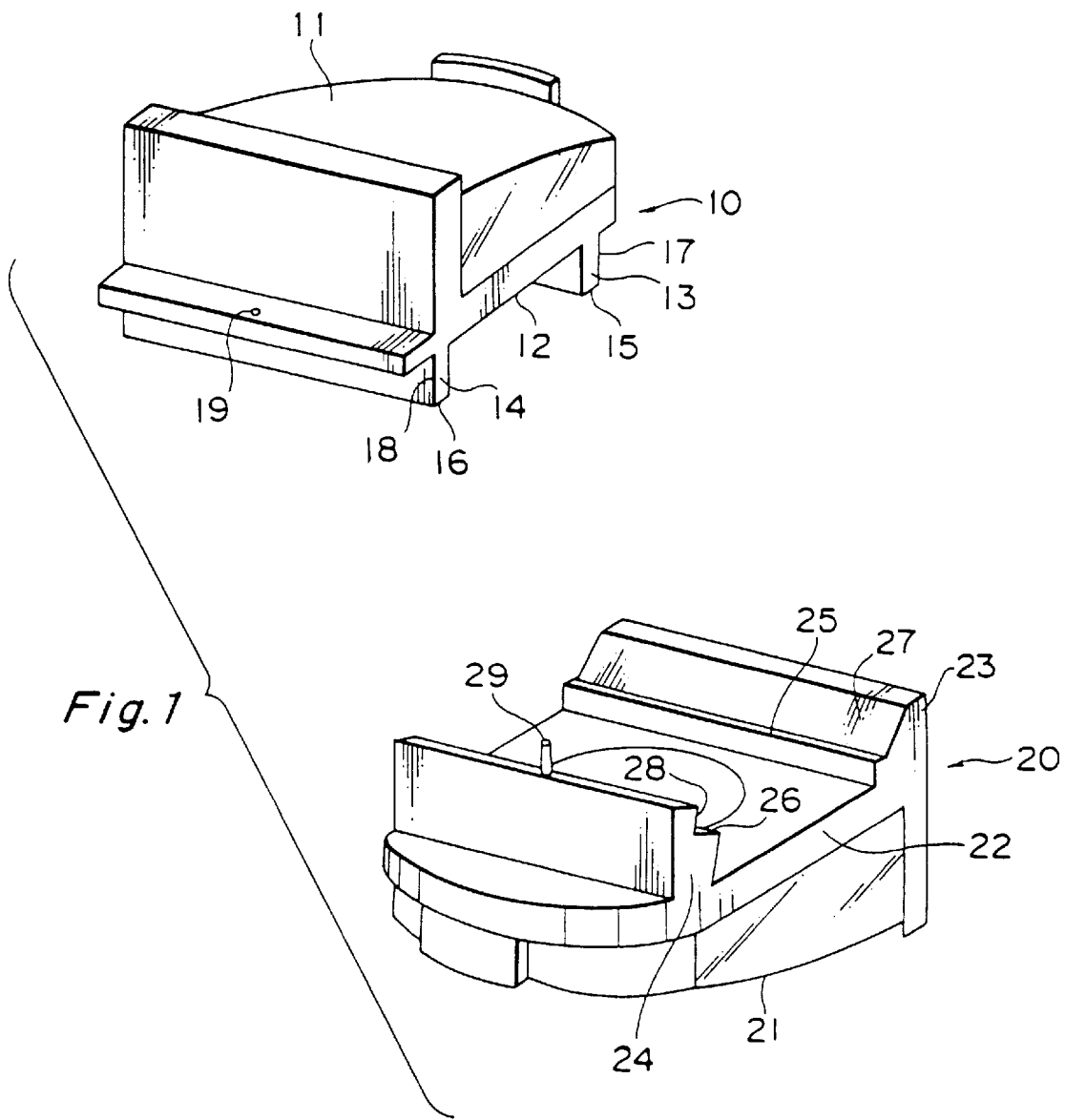
FIG. 1 is an explanatory view of a pair of lens holding frames, with noncircular lenses, which are coupled with each other by a lens holding structure, according to a first embodiment of the present invention.

Before the description of the present invention proceeds, it is to be noted that like or corresponding parts are designated by like reference numerals throughout the accompanying drawings.

Figure 2:
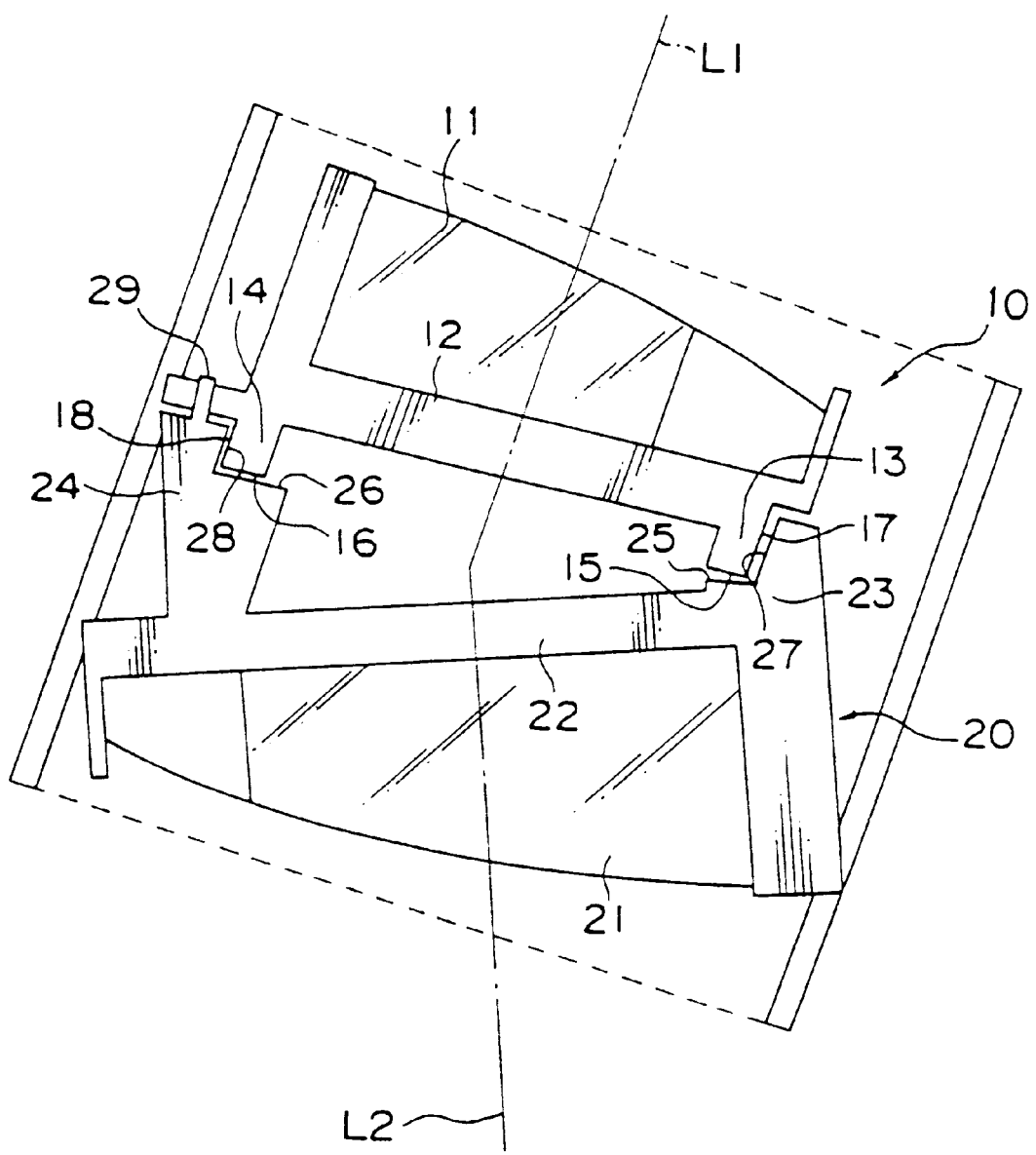
FIG. 2 is an explanatory view showing a state in which the pair of lens holding frames of FIG. 1 are coupled to each other.

FIG. 1 shows a pair of noncircular lens mounted on a pair of lens holding frames, used in a coupling structure for connecting a plurality of lens holding frames each frame of which holds the noncircular lens therein, according to a first embodiment of the present invention. In the figure, a reference numeral 10 denotes a first lens holding frame which holds a first noncircular lens 11, and a reference numeral 20 denotes a second lens holding frame which holds a second noncircular lens 21, respectively. On rear faces of main base portions 12 and 22 on which the lenses 11 and 21 are placed, each parallel two plate-shaped joint portions 13, 14 and 23, 24 are provided so as to be protruded. These plate-shaped joint portions are fitted to each other as shown in FIG. 2, thereby coupling the first lens holding frame 10 and the second lens holding frame 20 with each other.

The first joint portions 13, 14 of the first lens holding frame 10 are protruded from the base portion 12 so as to be parallel with and aligned with the centering axis L1 of the first noncircular lens 11 which is held by the first lens holding frame itself. End faces 15, 16 of the first joint portions 13, 14 are both perpendicular to the centering axis L1, while side faces 17, 18 thereof are both parallel with the centering axis L1. The second joint portions 23, 24 of the second lens holding frame 20, are not aligned with a centering axis L2 of the second noncircular lens 21 which is held by the lens holding frame itself (second lens holding frame). But the second joint portions 23, 24 have faces 25, 26 perpendicular to the centering axis L1, and have faces 27, 28 parallel to the centering axis L1 of the first noncircular lens 11, with the aim of fitting to the joint portions 13, 14 of the counterpart lens holding frame (first lens holding frame).

With the adoption of such an arrangement in which the first joint portions 13, 14 and the second joint portions 23, 24 are fitted to each other, even if the centering axis L2 of the second noncircular lens 21 is inclined at a specified angle with respect to the centering axis L1 of the first noncircular lens 11, the first and second lens holding frames 10 and 20 can be coupled with each other by moving them along in parallel with the centering axis of one lens holding frame (the first lens holding frame in this example). In particular, since the side faces 17, 18 of the first joint portions 13, 14 and the faces 27, 28 of the second joint portions 23, 24 are opposed to each other, the first and second lens holding frames 10 and 20 can be restricted from turning about the centering axis L1. Therefore, the first noncircular lens 11 and the second noncircular lens 21 can be put into an optically correct positional relation.

In addition, reference numerals 19 and 29 in the figure denote a small hole and a pin, respectively, which are to be fitted to each other, and their fitting restricts the relatively parallel or translational movement between the first lens holding frame 10 and the second lens holding frame 20.

Figure 3:
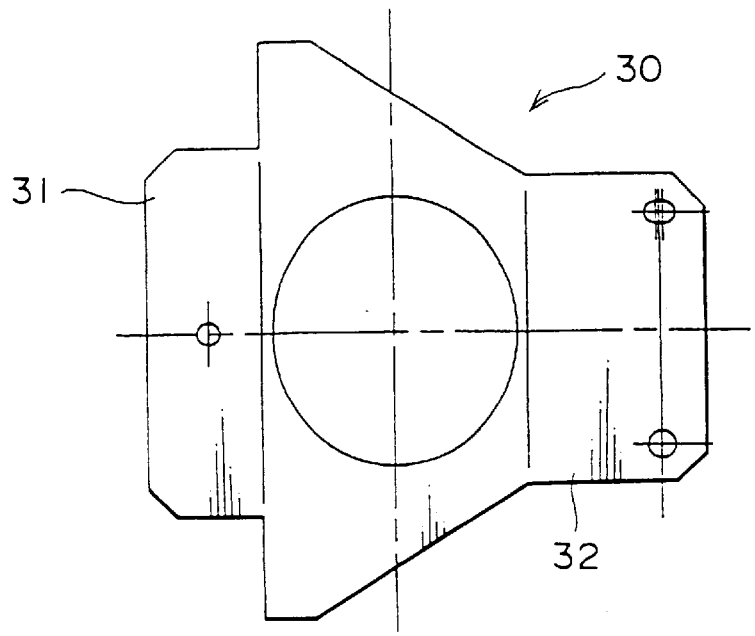
FIG. 3 is a view showing a light-flux restricting member to be incorporated in the lens holding structure of FIG. 2.
Figure 4:
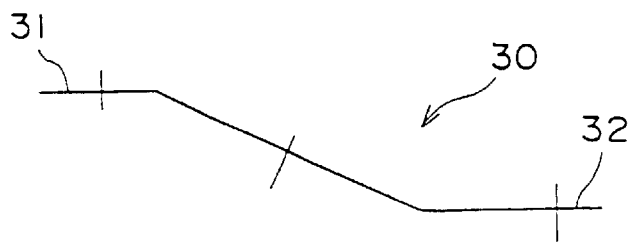
FIG. 4 is a view showing a light-flux restricting member to be incorporated in the lens holding structure of FIG. 2.
Figure 5:
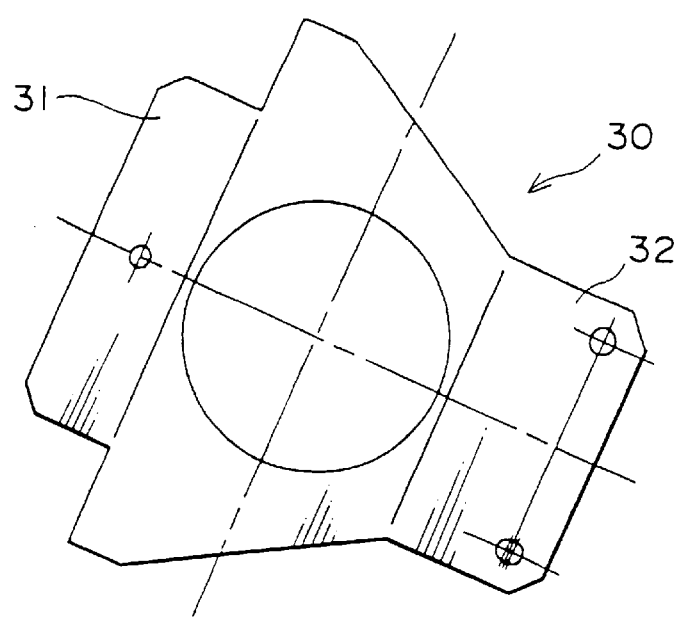
FIG. 5 is a view showing a light-flux restricting member to be incorporated in the lens holding structure of FIG. 2.
Figure 6:
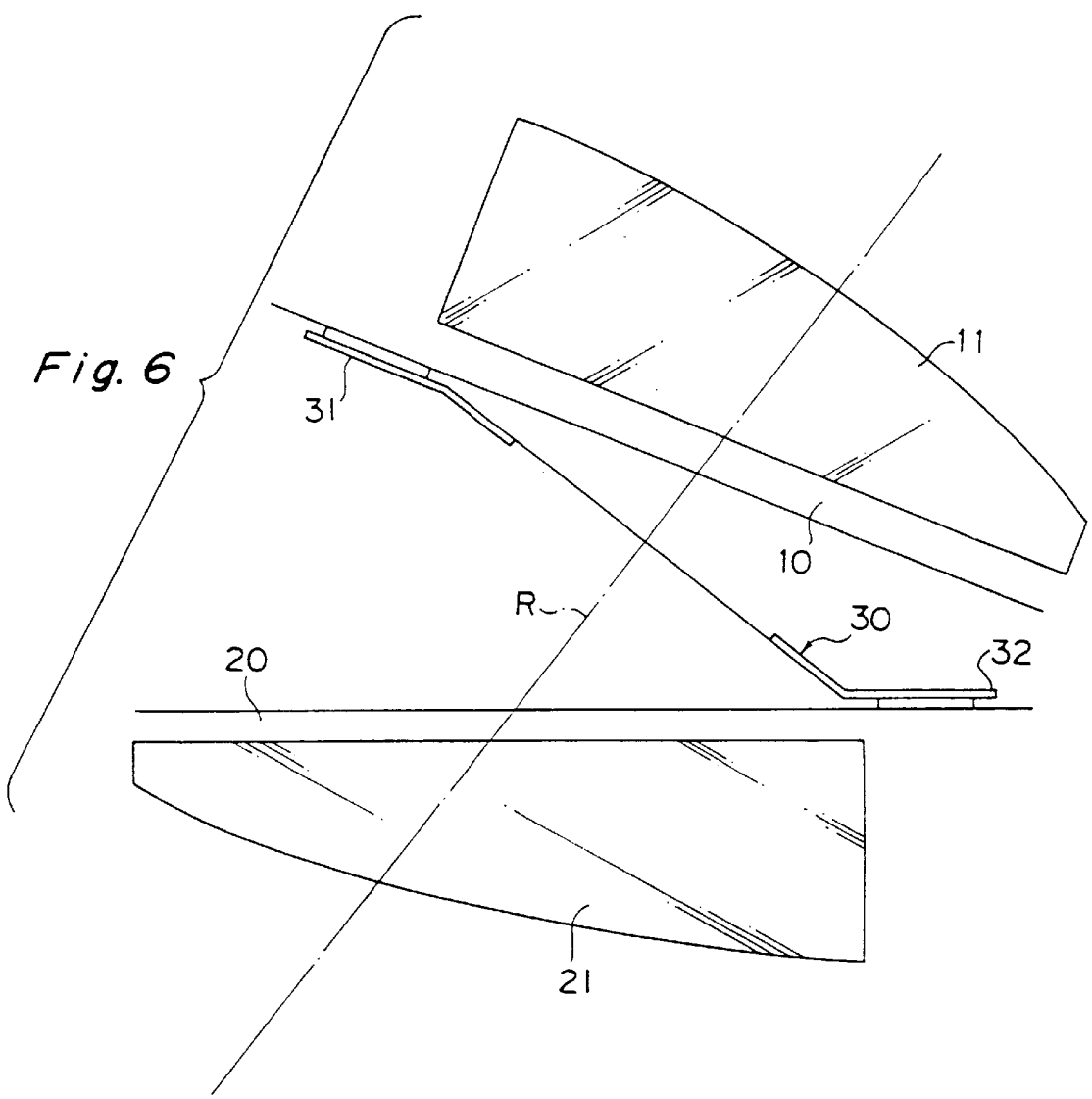
FIG. 6 is a main part enlarged view showing a state in which the light-flux restricting member of FIG. 3 is assembled to the lens holding structure of FIG. 2.

In case that a light-flux restricting member is placed between the first lens holding frame 10 and the second lens holding frame 20, which have been coupled together as shown in FIG. 2, the centering axes of the noncircular lenses held by the respective lens holding frames are not a common axis. Therefore, the light-flux restricting member can not be interposed between faces perpendicular to the common axis. Hence, if the light-flux restricting member 30 is bent as shown in FIGS. 3, 4 and 5 with one end 31 thereof being fixed to the first lens holding frame 10 and the other end 32 being fixed to the second lens holding frame 20 as shown in FIG. 6, the light-flux restricting member 30 can be set so as to be perpendicular to an optical axis R (shown in FIG. 6) given between the two first lens holding frames 10, 20.

Figure 7:
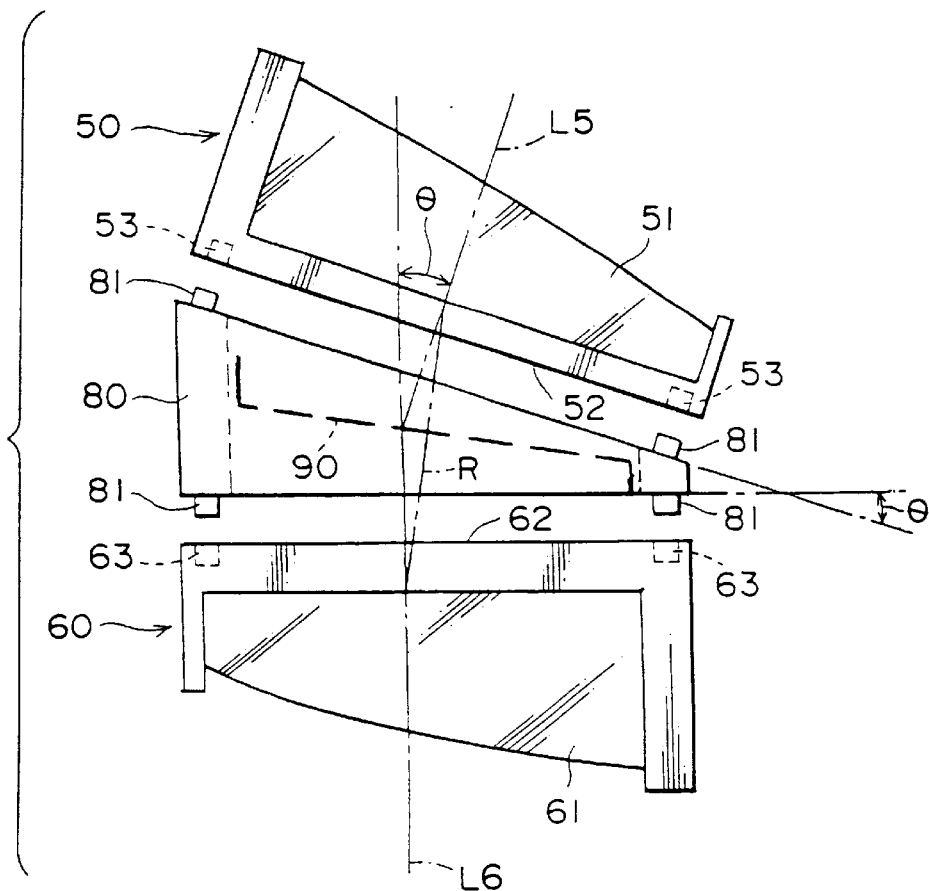
FIG. 7 is an explanatory view of a pair of lens holding frames, with noncircular lenses, which are coupled with each other by a lens holding structure, according to a second embodiment of the present invention.

FIG. 7 shows a pair of noncircular lens mounted on a pair of lens holding frames, used in a coupling structure for connecting a plurality of lens holding frames each frame of which holds the noncircular lens therein, according to a second embodiment of the present invention. In this embodiment, two lens holding frames 50, 60 are coupled with each other via a wedge-shaped spacer 80, placed therebetween, which is inclined at an angle equal to the angle theta which forms between centering axes L5, L6 of the noncircular lenses 51, 61 held by the lens holding frames 50, 60, respectively.

The two lens holding frames 50, 60 have axial end faces 52, 62 perpendicular to their respective centering axes L5, L6, and therefore the angle between the two centering axes L5, L6 can be made into the predetermined angle theta by putting these axial end faces 52, 62 into abutment against the two end faces of the wedge-shaped spacer 80. In the figure, a reference numeral 81 denotes turn-restricting pins, which are to be fitted into recesses 53, 63 formed in the end faces 52, 62 of the two lens holding frames 50, 60, respectively, by which the lens holding frames 50, 60 are restricted from turning relative to the spacer 80 so that an expected optical system is formed.

Adopting such an arrangement makes it possible to utilize what are made by referencing respective centering axes of the lenses, in assembling the structure with the centering axes being inclined to each other.

The wedge-shaped spacer 80 is formed into a cylindrical shape which is hollow in its interior, and a light-flux restricting member 90 is installed in the interior. This light-flux restricting member 90 is also inclined so as to be perpendicular to an optical axis R given between the two noncircular lenses 51, 61. The light-flux restricting member 90 is not attached in a sandwiching structure; therefore, the inclination angle can be set freely. In other words, the light-flux restricting member 90 can be easily made perpendicular to the optical axis.

Figure 8:
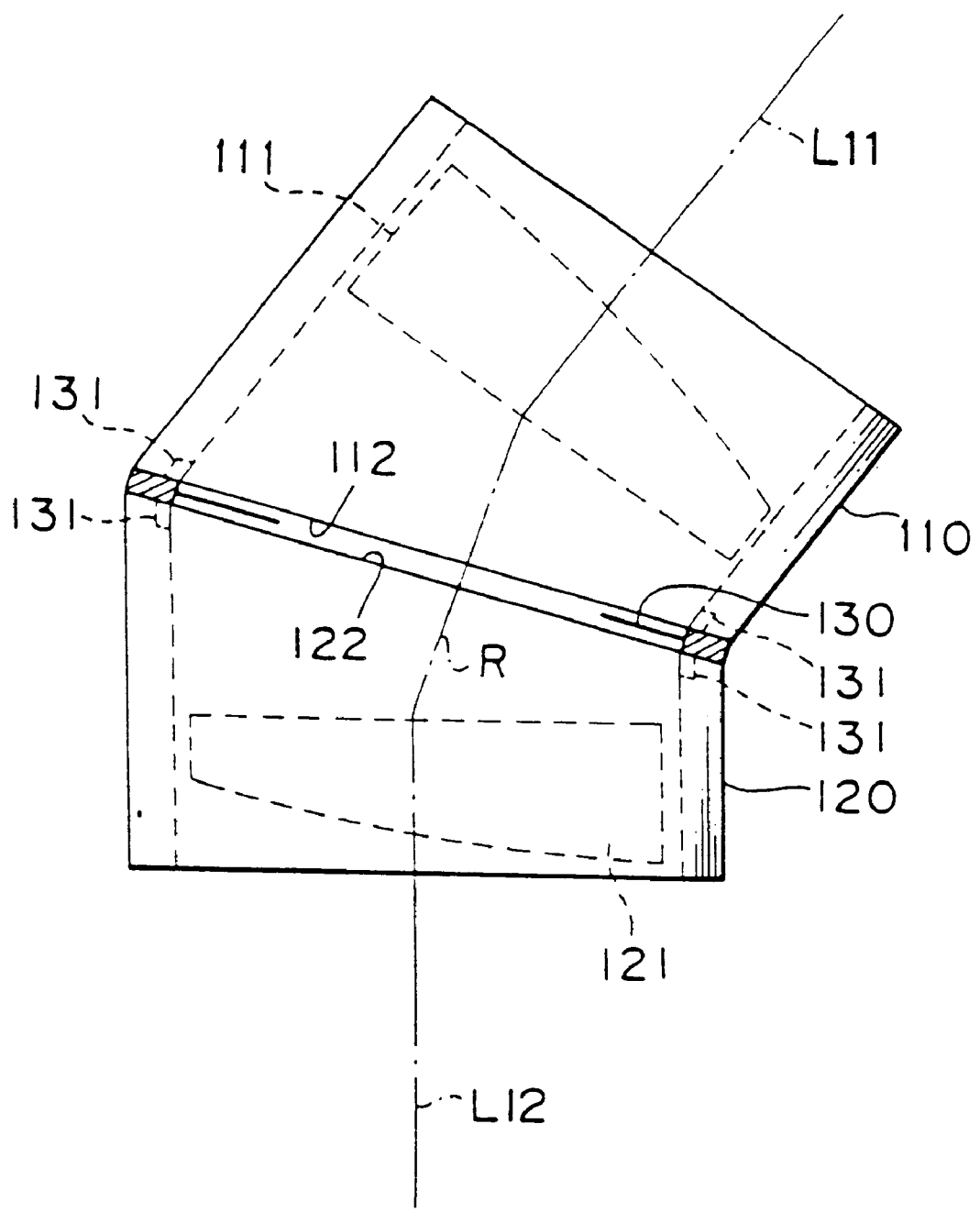
FIG. 8 is an explanatory view of a pair of lens holding frames, with noncircular lenses, which are coupled with each other by a lens holding structure, according to a third embodiment of the present invention.

FIG. 8 shows a pair of noncircular lens mounted on a pair of lens holding frames, used in a coupling structure for connecting a plurality of lens holding frames each frame of which holds the noncircular lens therein, according to a third embodiment of the present invention. In this embodiment, in two lens holding frames 110, 120, a pair of centering axes L11, L12 of noncircular lenses 111, 121, which are held by the lens holding frames 110, 120, respectively, are both inclined to each other, where end faces 112, 122 being coupled together in their respective axial directions are inclined so as to be opposed to each other. The inclination of these axial end faces 112, 122 is such that the end faces 112, 122 are perpendicular to the optical axis R given between the two lenses 111, 121.

Between the two end faces 112, 122, a light-flux restricting member 130 is sandwiched. The light-flux restricting member 130 has its protruded fitting portions 131, as a stopper, which are fitted into the two lens holding frames 110, 120, thereby preventing the lens holding frames 110, 120 from mutual rotation relative to the light-flux restricting member 130, to form an expected optical system. In this way, with such a simple construction, a light-flux restricting member can be sandwiched between the lens holding frames that hold the noncircular lenses having their centering axes inclined to each other.

By the way, a stopper, as described above, for preventing mutual rotation therebetween, is not limited to the coupling structure in which noncircular lenses are held. For example, the stopper can also effectively apply to a construction in which circular lenses are held by a lens holding frame or a lens barrel where the circular lenses are decentered. Also, the stopper can also effectively apply to a construction in which such lens holding frames themselves are held so as to be decentered with each other.

Further, the method of holding the light-flux restricting member according to the present invention is not limited to the application to the lens holding frames that hold noncircular lenses. For example, in case that a coaxial system is established in one lens holding frame, the method is also effective to a case in which a plurality of such lens holding frames are decentered. In the case, it is preferable to make the end faces of the lens holding frames perpendicular to the optical axis.

Figure 9:
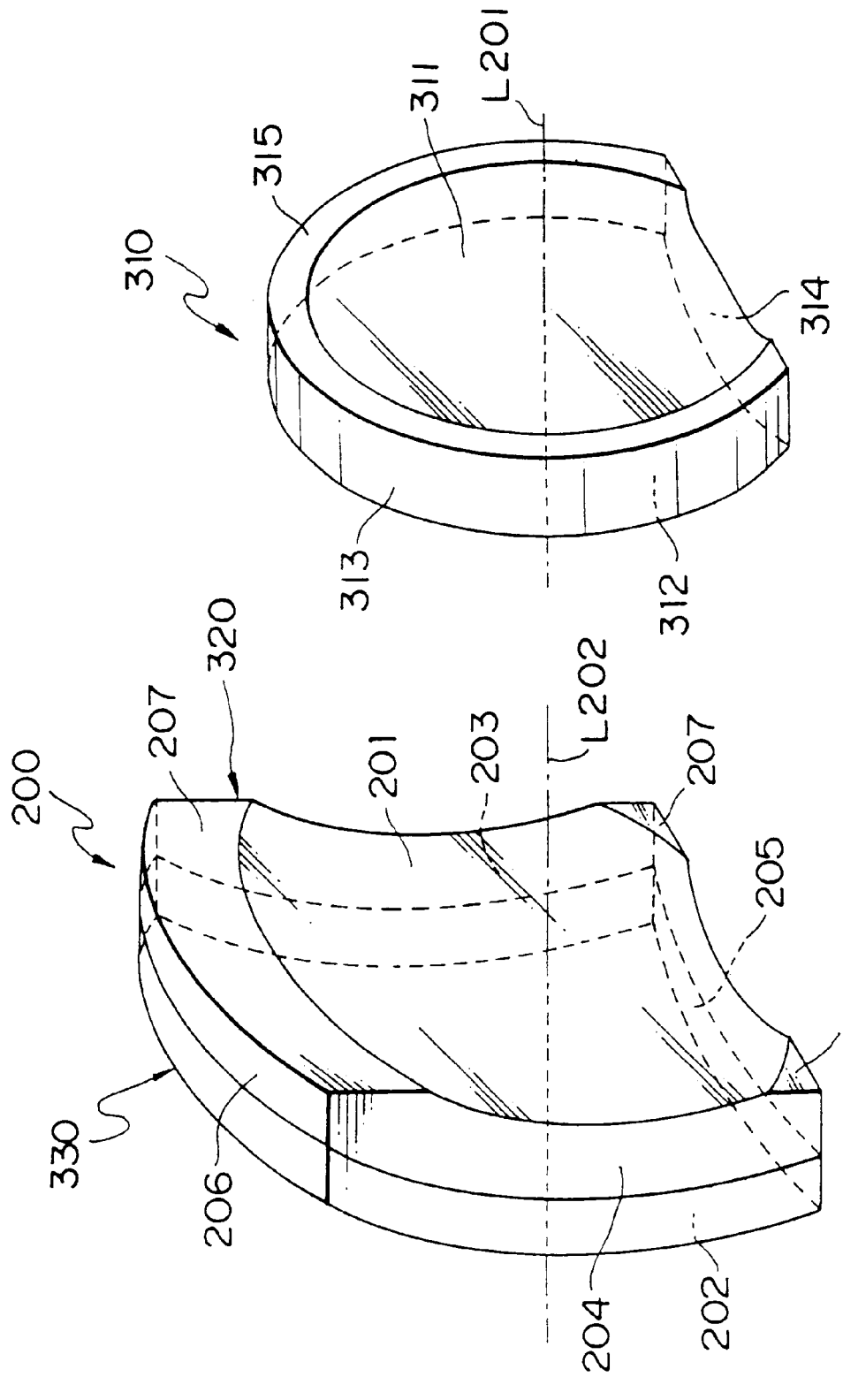
FIG. 9 is a perspective view showing a pair of lenses which are used in a lens positioning method, according to a fourth embodiment of the present invention.
Figure 10:
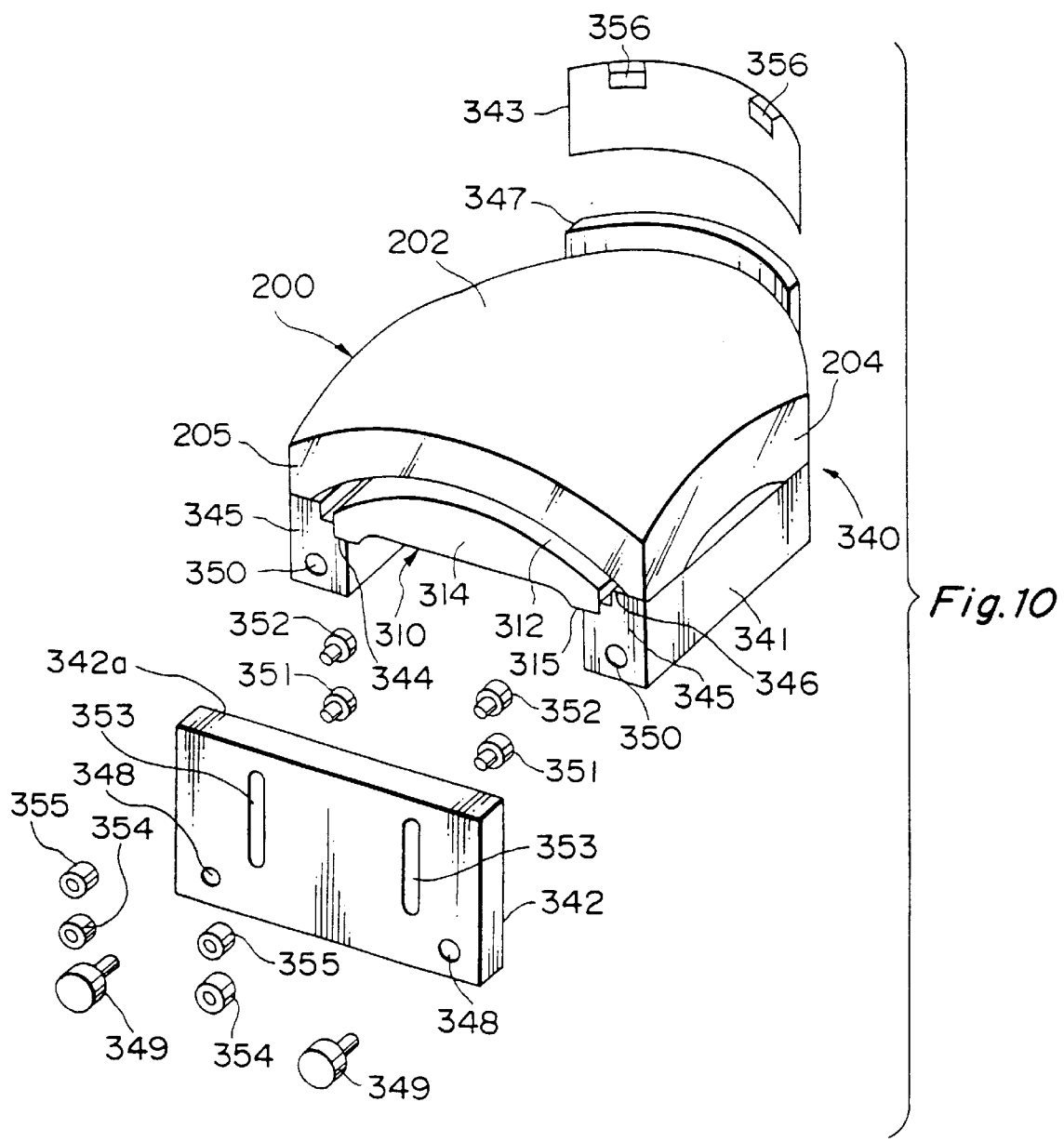
FIG. 10 is an exploded perspective view of a whole structure in which the lenses shown in FIG. 9 are used.
Figure 11:
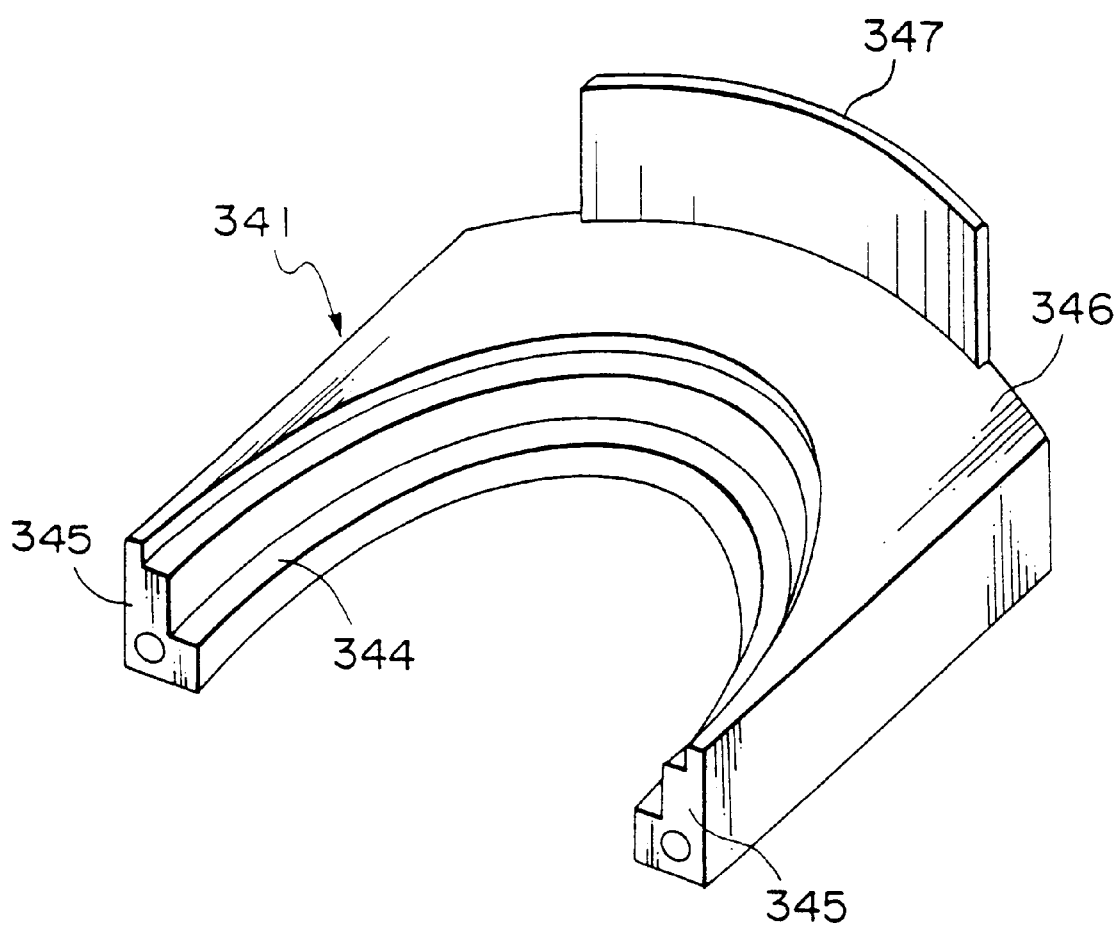
FIG. 11 is a perspective view showing a lens holding frame used in the structure shown in FIG. 10.

FIGS. 9, 10 and 11 show a plurality of lenses which are used in a positioning method for positioning the lenses, according to a fourth embodiment of the present invention. In the figures, a reference numeral 310 denotes a first lens, 320 denotes a second lens, and 330 denotes a third lens, where the second lens 320 and the third lens 330 are formed as a combinational lens.

The first lens 310 has a first lens surface 311 and a second lens surface 312, which are both surfaces through which the optical path in the optical system passes. In this example shown, the first lens surface 311 is given by a concave curved surface, while the second lens surface 312 is given by a convex curved surface. In a peripheral surface of the first lens 310, are formed a circumferential edge surface 313 comprising a circumferential surface and a cut surface 314 comprising a flat surface, where the first lens 310 is a noncircular lens which is so called a cut lens. The circumferential edge surface 313 extends more than 1800 with respect to a centering axis L201 so that the centering axis L201 is present on the lens.

The circumferential edge surface 313 and the cut surface 314 are both parallel to the centering axis L201 of the first lens 310. The cut surface of the lens can be machined with a very high accuracy, and the cut surface 314 is formed with high accuracy at a location of a specified distance from the centering axis L201 On the periphery of the first lens surface 311, is formed a flat surface 315 vertical to the circumferential edge surface 313 and the cut surface 314, where the flat surface 315 is vertical to the centering axis L201 of the lens 310. Hereinafter, this flat surface will be referred to as an axi-perpendicular flat surface 315.

The second lens 320 and the third lens 330 are structured as if they are a single lens. Hereinafter, these lenses 320 and 330 will be referred to as a second lens group 200. The second lens group 200 has a third lens surface 201 and a fourth lens surface 202. In this example shown, the third lens surface 201 is formed by a concave curved surface, while the fourth lens surface 202 is given by a convex curved surface. The second lens group 200 has, on three sides thereof, flat cut surfaces (both-side cut surfaces and bottom cut surface) 203, 204, 205 and a circumferential edge surface 206 on one side thereof. The second lens group 200 has a common centering axis L202 of the two lenses.

On the periphery of the third lens surface 201, axi-perpendicular flat surfaces 207 are formed at three positions thereof so as to be present within the same plane vertical to the common centering axis L202. These three axi-perpendicular. flat surfaces 207 may be one continuous flat surface, when the both-side cut surfaces 203, 204 are located far from the centering axis L202.

In this fourth embodiment, the distance from the centering axis L201 to the bottom cut surface 314 in the first lens 310, and the distance from the centering axis L202 to the bottom cut surface 205 in the second lens group 200 are set equal to each other. The cut surfaces in the individual lenses are formed with high accuracy.

FIG. 10 is an exploded view showing the first lens 310 and the second lens group 200, as well as a lens holding frame 340 that holds these lenses. The first lens 310 has the second lens surface 312 and the cut surface 314 shown in the figure, while the second lens group 200 has the fourth lens surface 202, one-side cut surface 204 and bottom cut surface 205 shown therein. The lens holding frame 340 comprises: a frame body 341; a spacer plate member 342 which is attached to the frame body 341 so as to abut against the bottom cut surfaces 314 and 205 of the first lens 310 and the second lens group 200, by which these lenses 310, 200 are prevented from rotating; and a lens holding member 343 for pressing the second lens group 200 against the frame body 341.

The frame body 341, as shown in FIG. 11, has a generally horseshoe-shaped opening formed in a center thereof. This opening is so shaped that the first lens 310 fits thereto in such a manner that the inner peripheral surf ace of the opening and the circumferential edge surface 313 of the first lens 310 coincide with each other, where a stepped portion 344 extending along the inner peripheral portion abuts against the S axi-perpendicular flat surface 315 of the first lens 310. Also, in a state in which the first lens is fitted, the bottom cut surface 314 of the first lens 310 and an end face 345 of the frame body 341 become flush with each other. The first lens 310 has a circumferential edge surface 313 with a center angle greater than 1800 about the centering axis L201. In the state that the first lens 310 is fitted to the frame body 341, whereas the first lens 310 can rotate until the spacer plate member 342 is attached to the frame body 341, the position of the centering axis L201 relative to the lens holding frame 340 does not change even if the first lens 310 makes a turn. Therefore, this first lens 310 is taken as a reference lens.

A main surface 346 of the frame body 341 is a flat surface parallel to the stepped portion 344, and therefore a flat surface vertical to the centering axis L201 of the first lens 310 fitted to the frame body 341.

The second lens group 200 is placed on the frame body 341 so that the axi-perpendicular flat surface 207 of the second lens group 200 abuts against the main surface 346. When the axi-perpendicular flat surface 207 is in abutment against the main surface 346, the inclination of the second lens group 200 relative to the lens holding frame 340 is eliminated.

In the figure, a reference numeral 347 denotes a guide plate, which is given by the same circumferential surface as the circumferential edge surface 206 so that the edge surface 206 of the second lens group 200 abuts against the guide plate 347. In the state that the circumferential edge surface 206 is in abutment with the guide plate 347, the centering axis L202 of the second lens group 200 is prevented from shifting with respect to the centering axis L201 of the first lens 310, which is the reference lens, in a direction perpendicular to the centering axis L201 thereof.

Whereas the second lens group 200 is rotatable about the centering axis L202 only with the second lens group 200 placed on the main surface 346, the second lens group 200 is restricted from turning by putting the bottom cut surface 205 of the second lens group 200 into abutment against a surface 342a of the spacer plate member 342.

In the spacer plate member 342, screw insertion holes 348 for passing screws 349 therethrough are formed. The screws 349 serve for fitting and securing the spacer plate member 342 to the frame body 341, while screw holes 350 to which the screws 349 are fitted are formed in the end face 345 of the frame body 341. Further in the spacer plate member 342, slits 353 for passing screws 351, 352 therethrough are formed so as to pinch the first lens 310 and the second lens group 200 against the frame body 341. In the figure, reference numerals 354 and 355 denote nuts to be screwed with the screws 351, 352.

The lens holding member 343 is provided with claw portions 356 which abut against the fourth lens surface 202 of the second lens group 200 to press the second lens group 200 against the main surface 346 of the frame body 341 when the lens holding member 343 is attached to the guide plate 347.

In assembling the first lens 310 and the second lens group 200 to the lens holding frame 340 in the way as shown above, a center of the lens holding frame 340 and a center of the reference lens coincide with each other so as to be coincident with the centering axis L201 with the frame body 341 and the first lens 310 being fitted to each other, and then the centering axis of the second lens group 200 can be easily made coincident with the above common center. Accordingly, the expected function as an optical system can be fulfilled.

Figure 12:
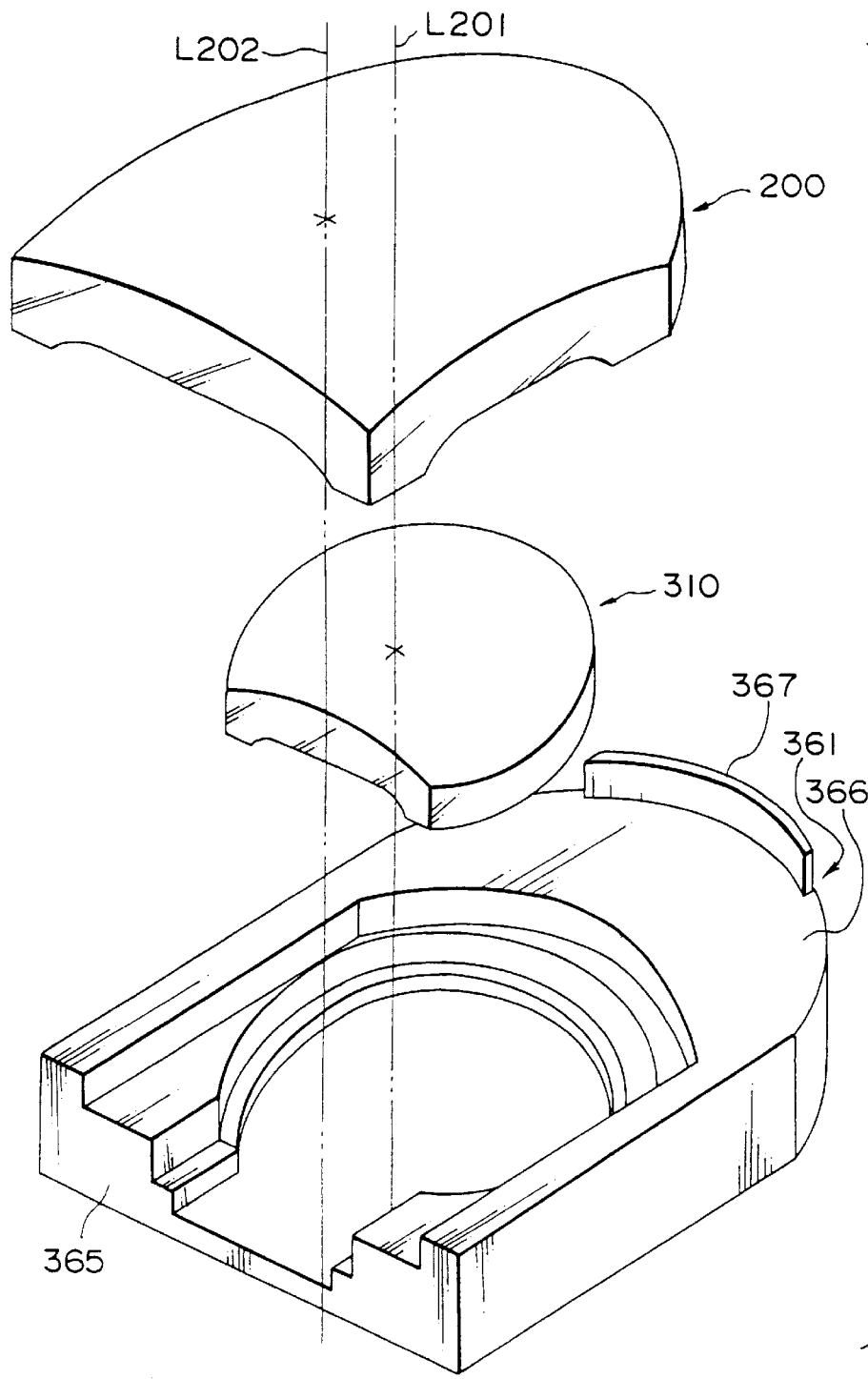
FIG. 12 is an exploded perspective view showing a pair of lenses which are used in a lens positioning method, according to a fifth embodiment of the present invention.

In the above example, the centering axis L201 of the first lens 310 and the centering axis L202 of the second lens group 200 are coincident with each other. Meanwhile, in an optical system in which the centering axis L202 of the second lens group 200 is positively shifted in parallel with respect to the centering axis L201 of the first lens 310 in a direction perpendicular to the centering axis L201 thereof, as shown in FIG. 12, a positional change of the second lens group 200 with respect to the first lens 310, which is the reference lens, causes the optical system as a whole to change. Accordingly, the second lens group 200 must not rotate.

The figure shows a pair of lenses which are used in a positioning method for positioning the lenses with centering axes of the lenses being shifted, according to a fifth embodiment of the present invention. In the figure, the arrangement of the first lens and the second lens group is as shown in FIG. 9. In addition, lens fixing means such as the lens holding member and the screws may be implemented by means equivalent to those shown in FIG. 10. Therefore they are omitted in the drawings for simplicity.

In the lens holding frame, as shown in the figure, an opening matching the profile of the first lens 310 is formed in a generally central portion of the frame body 361, so that the first lens 310 is fitted thereto. In this fitted state, the bottom cut surface 314 of the first lens 310 is spaced by a specified distance from an end face 365 of the frame body 361. This specified distance is the amount of the parallel shifting or decentering between the second lens group 200 and the first lens 310. In the state that the circumferential edge surface 206 is in abutment with a guide plate 367, the centering axis L202 of the second lens group 200 is shifted a predetermined distance in parallel with respect to the centering axis L201 of the reference lens 310 in a direction perpendicular to the direction in which the centering axis L201 thereof exists.

Figure 13:
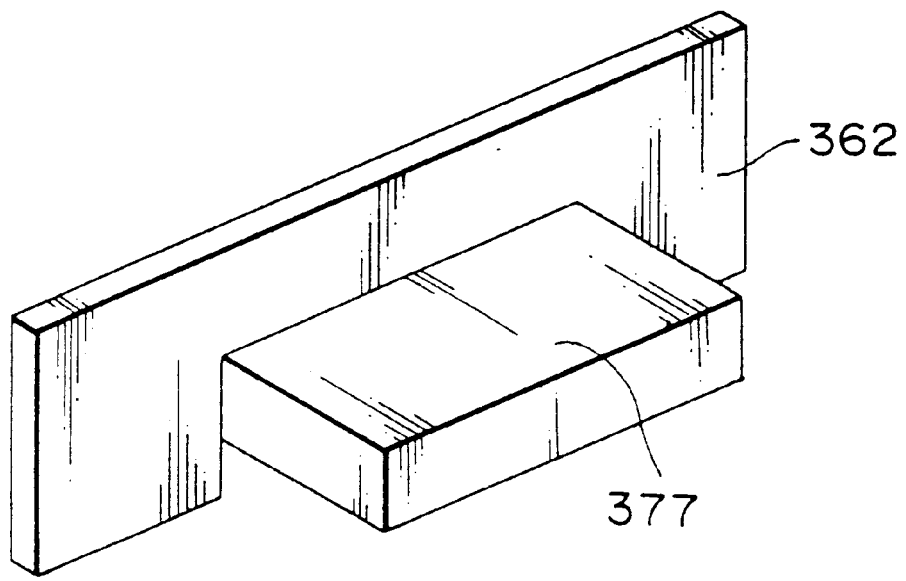
FIG. 13 is a perspective view showing a spacer plate member used in the fifth embodiment of the present invention.
Figure 14:
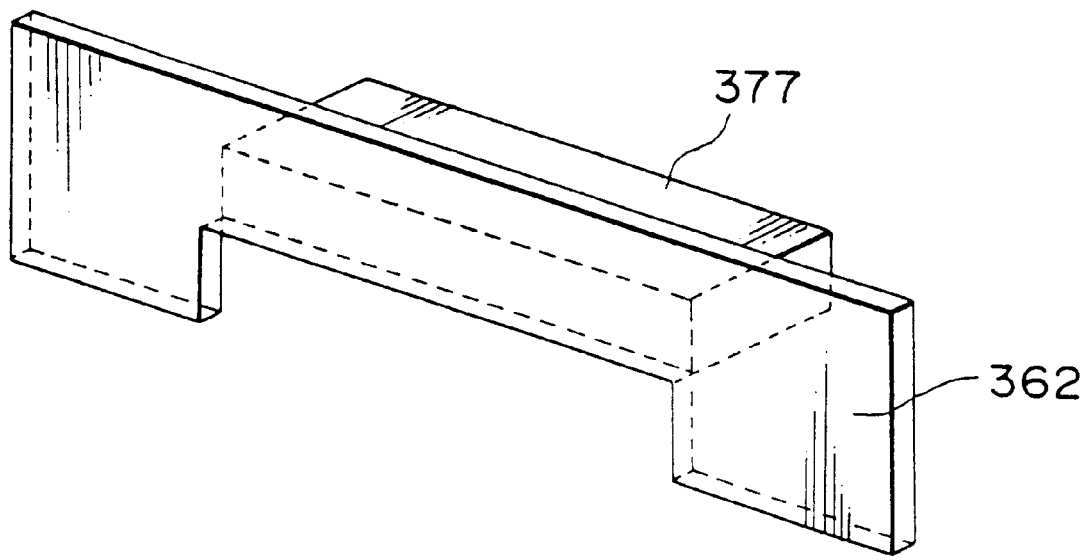
FIG. 14 is a perspective view showing the spacer plate member used in the fifth embodiment of the present invention.

Also, in this state, the bottom cut surface 205 of the second lens group 200 and the end face 365 of the frame body 361 are coincident with each other. Whereas the second lens group 200 is rotatable about the centering axis L202 only with the second lens group 200 being placed on a main surface 366, the second lens group 200 is restricted from turning by putting the bottom cut surface 205 of the second lens group 200 into abutment against the spacer plate member 362 as shown in FIGS. 13 and 14. The spacer plate member 362, as shown in FIG. 13, has a protruded portion 377 formed so as to abut against the cut surface 314 of the first lens 310, where the amount of protrusion of the protruded portion 377 is equal to the amount of the parallel shifting of the second lens group 200 with respect to the first lens 310. FIG. 13 is a view thereof as seen from the protruded portion side, and FIG. 14 is a view thereof as seen from its opposite side.

As explained above, in case that the first lens 310 and the second lens group 200 are mounted relative to the lens holding frame, a center between the first lens 310 and the frame body 361 is determined. And, then, with respect to the center, the centering axis of the second lens group 200 is shifted a predetermined distance. Accordingly, the expected function as an optical system can be fulfilled.

Figure 15:
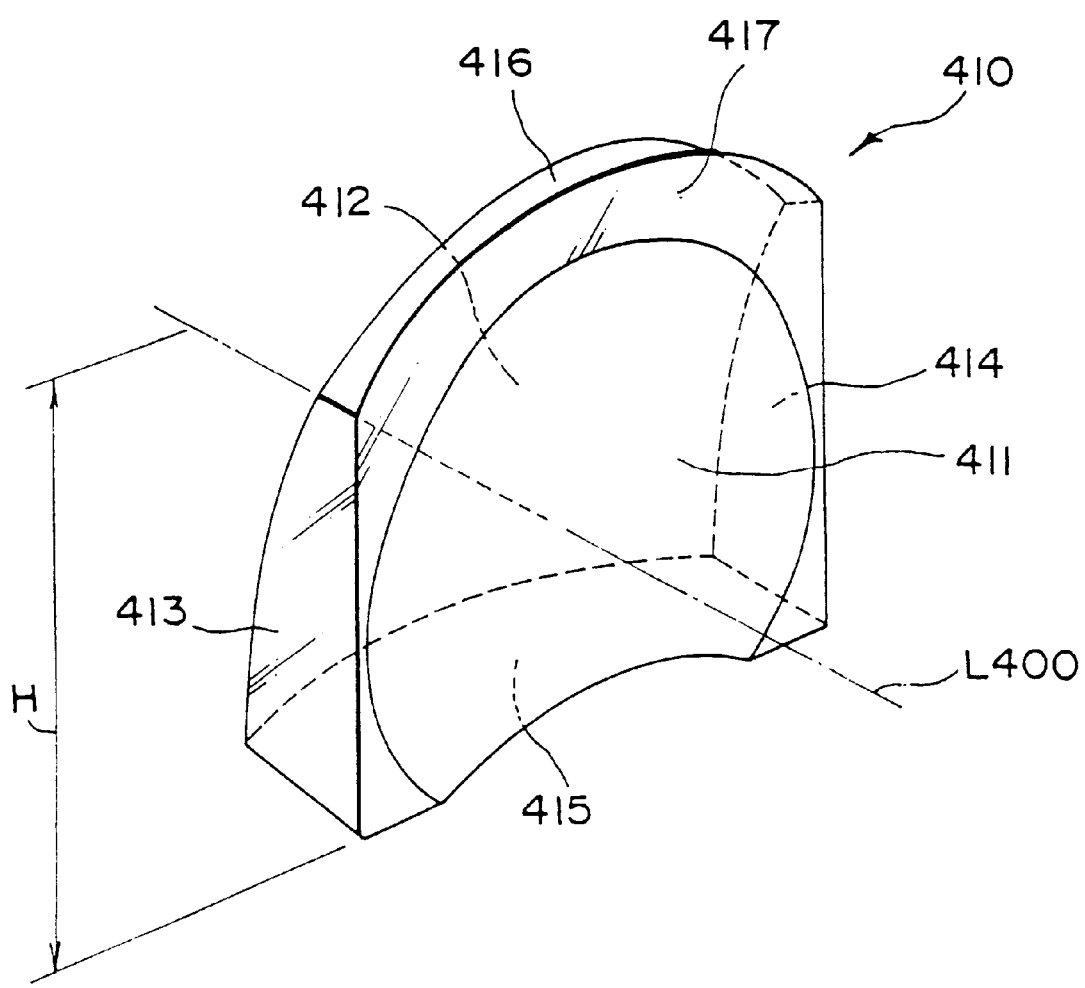
FIG. 15 is a perspective view showing a lens which is used in a lens positioning structure, according to a sixth embodiment of the present invention.

FIG. 15 shows a lens-used in a lens positioning method according to a six embodiment of the present invention. This lens 410 is a noncircular lens, so called a cut lens, which has a first lens surface 411 given by a concave curved surface, and has a second lens surface 412 given by a convex curved surface. This lens 410 also has, on its three peripheral side surfaces, flat edge surfaces 413, 414, 415 and a circumferential edge surface 416 on one side thereof. The four edge surfaces 413, 414, 415, 416 are all surfaces parallel to a centering axis L400 of the lens 410.

On the periphery of the first lens surface 411, a flat surface 417 vertical to these four edge surfaces 413, 414, 415, 416 is formed, and this flat surface 417 is a surface vertical to the centering axis L400 of the lens 410. Hereinafter, this flat surface will be referred to as an axi-perpendicular flat surface 417.

Figure 16:
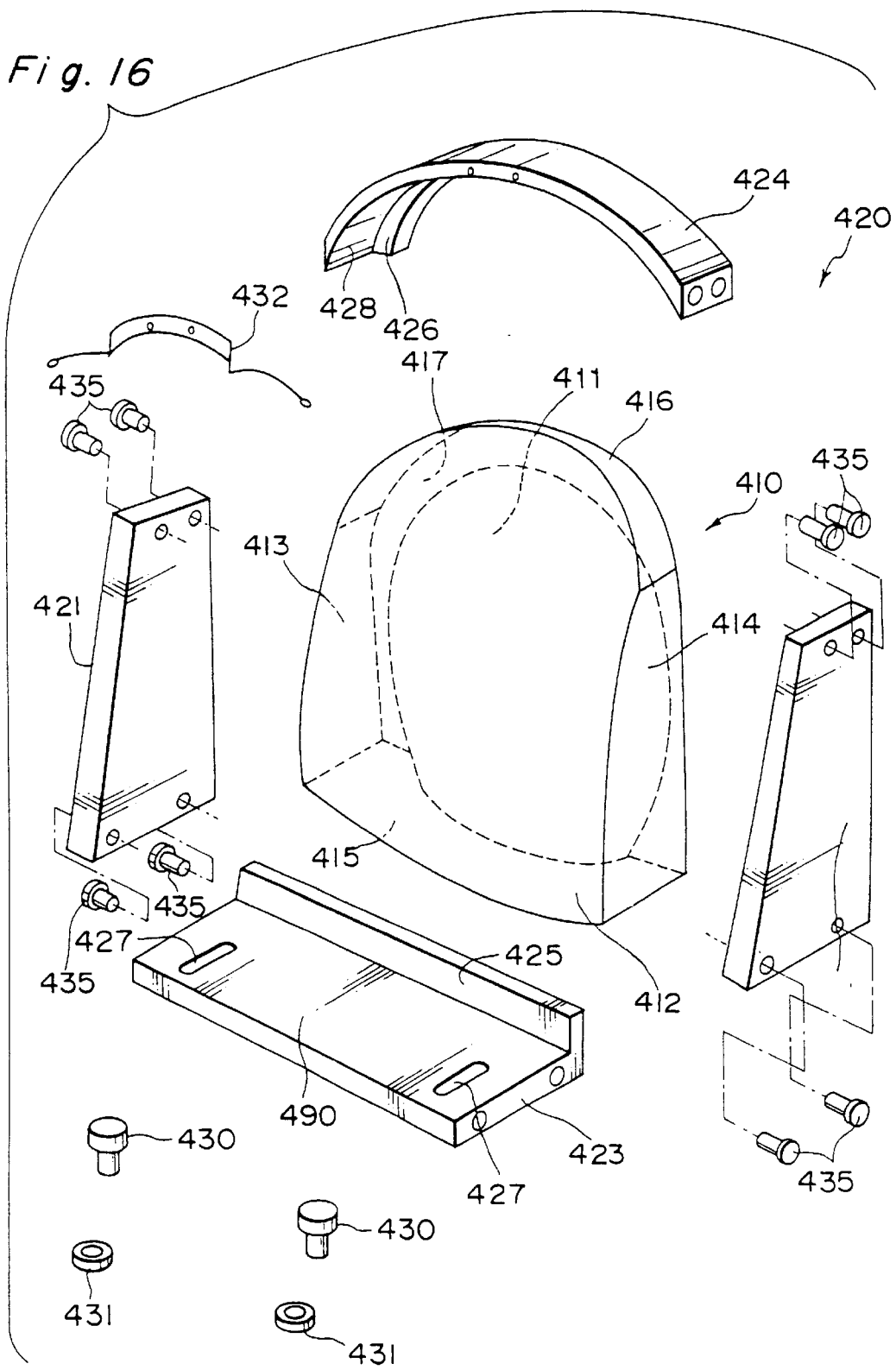
FIG. 16 is an exploded perspective view showing the lens positioning structure in which the lens of FIG. 15 is used.

FIG. 16 is an exploded view showing a lens holding frame 420 that holds the lens 410, where the second lens surface 412 of the lens 410 is shown. The lens holding frame 420 is divided into four wall members 421, 422, 423, 424 corresponding to the edge surfaces 413, 414, 415, 416 of the lens 410, respectively, and comprises a bottom wall 423 as well as two side walls 421, 422 having flat wall surfaces, and a top wall 424 having a wall surface 428 comprising a partial circumferential surface. The bottom wall 423 and the top wall 424 have stand walls 425, 426 that abut against the axi-perpendicular flat surface 417 of the lens 410.

Also, to the bottom wall 423, two screws 430 are attached to sandwich the bottom portion of the lens 410 against a stand wall 425. In the figure, a reference numeral 427 denotes a slit for inserting the screws 430 therethrough so that the screws 430 can be adjusted in position responsive to the thickness of the lens 410, where a reference numeral 431 denotes a tightening nut. Preferably, the screws 430 are made of resin so as not to damage the lens.

By the way, a reference numeral 490 points to a flat abutment surface, corresponding to the edge surface 415, which prevents the lens 410 from rotating relative to the lens holding frame 420, thus preventing a rotation between the lens 410 and the lens holding frame 420.

For positioning of the lens 410 with respect to the lens holding frame 420, first, the circumferential edge surface 416 of the lens 410 is made to abut against the circumferential wall surface 428 of the top wall 424, while the axi-perpendicular flat surface 417 adjacent along the circumferential edge surface 416 is also made to abut against the stand wall 426 of the top wall 424. In this state, the lens 410 is permitted to rotate about the centering axis L400 along the circumferential surface of the top wall 424, whereas such a parallel shift as the centering axis L400 of the lens 410 shifts in parallel with respect to its reference centering axis thereof itself within the lens holding frame 420 in a direction perpendicular to the direction in which the reference centering axis thereof exists is restricted. Thus, such a parallel shift of the lens 410 relative thereto is prevented accurately.

By the way, if the axi-perpendicular flat surface 417 of the lens 410 is in complete abutment against the stand wall 426 of the top wall 424 of the lens holding frame in this state, then the lens 410 can be positioned without the centering axis L400 being inclined. However, if height of the stand wall 426 is not enough, it may result in an unstable posture of the lens 410 in direction of inclination of the lens 410, i.e., there is a possibility in which the centering axis L400 of the lens 410 may incline to its reference centering axis thereof relative to the lens holding frame 420.

In the figure, a reference numeral 432 denotes a spring member which biases the top end part of the second lens surface 412 so that the axi-perpendicular flat surface 417 of the lens 410 is pressed against the stand wall 426 of the top wall 424. A central plate-shaped portion thereof is attached to a central part of the front end face of the lens-block top wall 424, and a pair of wire-like spring parts (which are shown to be rounded at ends in the figure) enter into the lens holding frame so as to abut against the top end portion of the second lens surface 412.

Next, the bottom portion of the lens 410 is sandwiched by the stand wall 425 of the lens-block bottom wall 423 and the screws 430. In the lens 410, the inclination of the lens 410 relative thereto is completely eliminated by the abutment structure between the axi-perpendicular flat surface 417 and the stand wall 426 of the lens-block top wall 424, and same structure between the axi-perpendicular flat surface 417 and the stand wall 425. This positioning process is carried out while the bottom wall 423 and the top wall 424 of the lens holding frame are kept abutting against a reference object (not shown) so that the bottom wall 423 and the top wall 424 are fixed to specified positions. However, if the structure is such that these walls 423, 424 are integrally coupled together, there is no need for such a reference object.

After the lens 410 has been positioned by the top wall 424 and the bottom wall 423 in such a way as described above, the two side walls 421, 422 of the lens holding frame can be assembled by any appropriate means regardless of the positioning accuracy of the lens 410. For example, it may be assembled to the bottom wall 423 and the top wall 424 by screws 435 as shown in FIG. 16, or otherwise by using adhesive.

Figure 17:
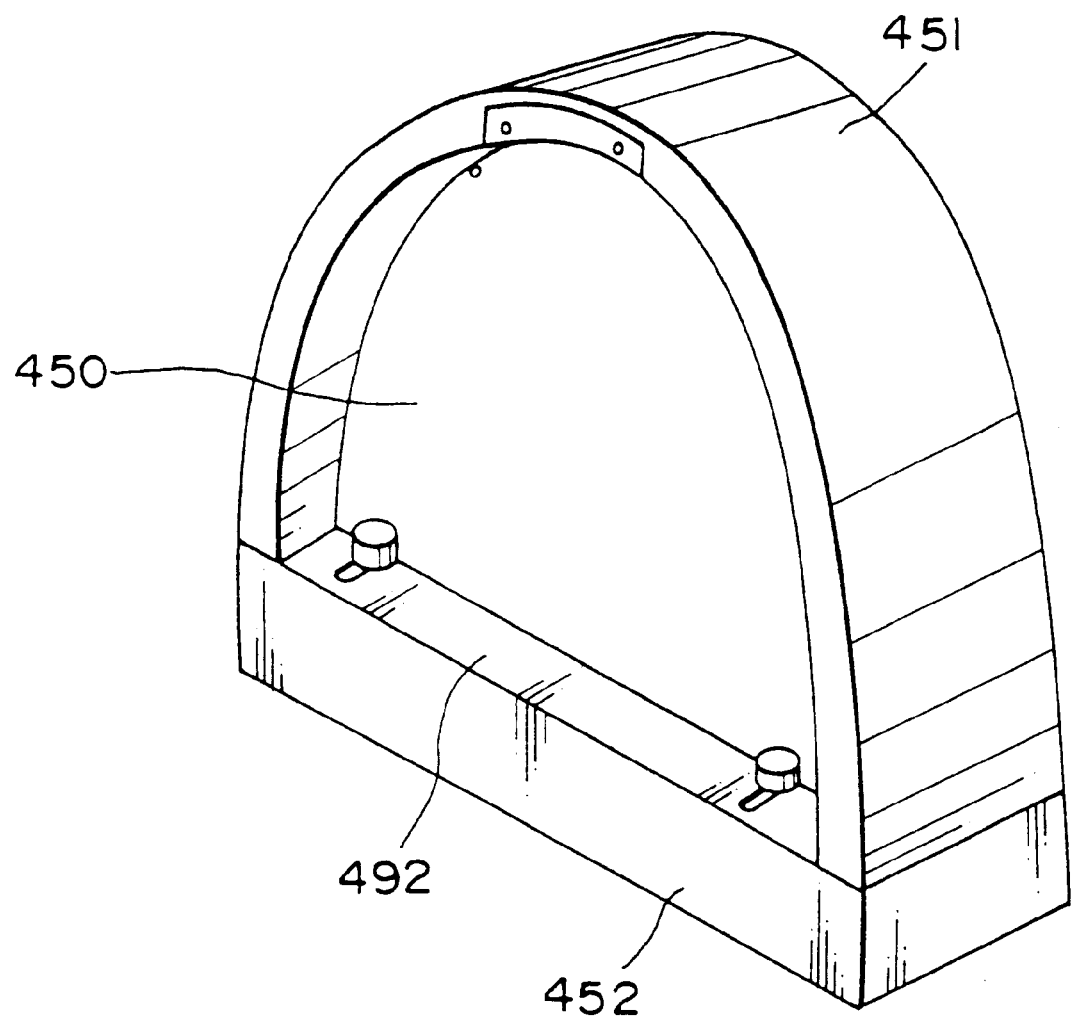
FIG. 17 is a perspective view showing a lens positioning structure, according to a seventh embodiment of the present invention.

In the above embodiment, the lens 410 has flat edge surfaces 413, 414 at both side surfaces. However, for positioning of a lens having such a peripheral configuration that the circumferential edge surface 416 at the top end is extended on both sides up to the flat edge surface 415 at the bottom portion, the lens holding frame can be made up of two wall members: an upper circumferential wall 451 extending along the circumferential edge surface of a lens 450, and a flat lower bottom wall 452, as shown in FIG. 17, as shown as a seventh embodiment of the present invention.

By the way, a reference numeral 492 points to a flat abutment surface, corresponding to the edge surface of the lens 450, which prevents the lens 450 from rotating relative to the lens holding frame 451, 452, thus preventing a rotation between the lens 450 and the lens holding frame.

Further, in the embodiment shown in FIG. 15, the axi-perpendicular flat surface 417 is formed into a length equal to the height H of the lens 410, and the two stand walls 425, 426 of the top wall 424 and the bottom wall 423 abut against the axi-perpendicular flat surface 417 at both end locations in the direction of height, so that the inclination of the lens 410 is eliminated securely.

Figure 18:
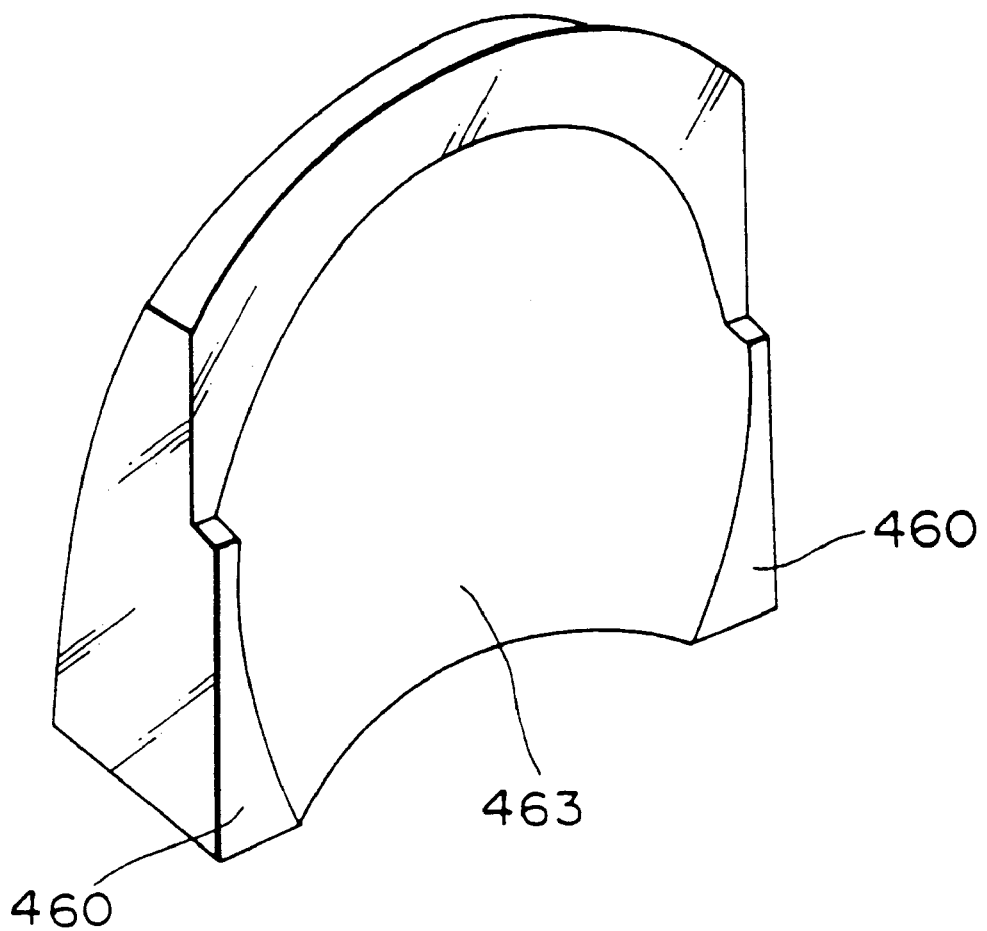
FIG. 18 is a perspective view showing a modification of lens which applies to the lens positioning structure according to the present invention.
Figure 19:
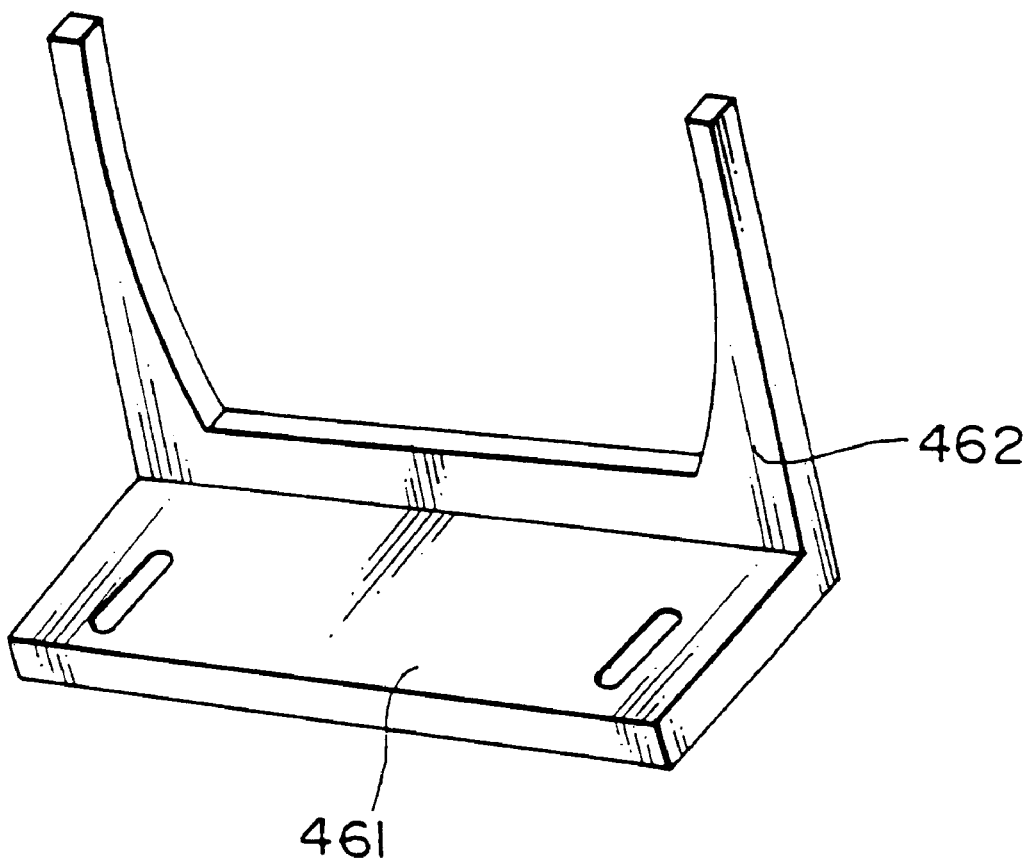
FIG. 19 is a perspective view showing a portion of lens holding frame which applies to the lens of FIG. 18.

However, for example as shown in FIG. 18, in case that the height of an axi-perpendicular flat surface 460 ranges to no more than a halfway of the lens height such that an axi-perpendicular flat surface cannot be formed on its top side part of the lens, a stand wall 462 of a bottom wall 461 can be extended along both sides of a first lens surface 463 at the same height as the axi-perpendicular flat surface 460 that ranges to no more than a halfway of the height, as shown in FIG. 19.

In this structure adopted, it is desirable that the height of the surface at which the axi-perpendicular flat surface 460 and the stand wall 462 abut against each other ranges to at least a half or more of the lens height, in order that the inclination of the lens is eliminated to a sufficient degree.

Figure 20:
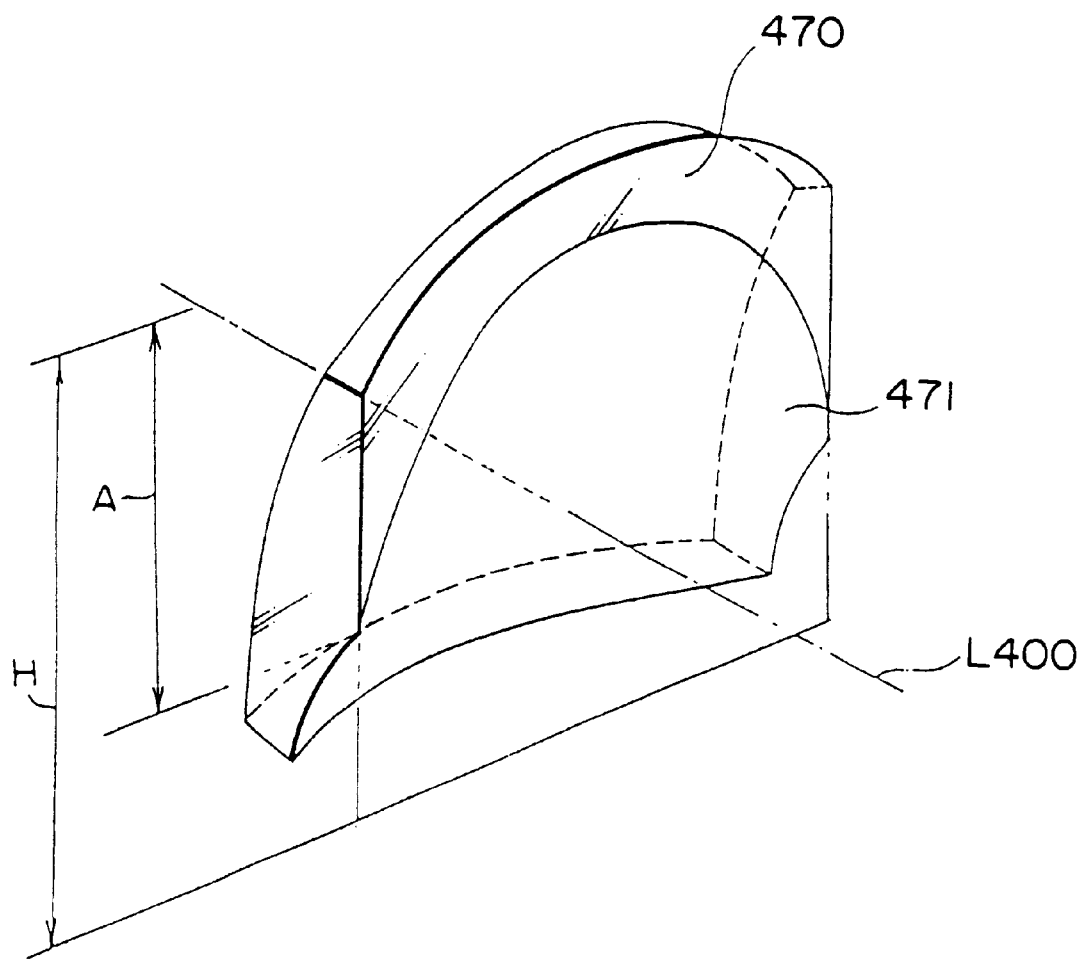
FIG. 20 is a perspective view showing another modification of lens which applies to the lens positioning structure according to the present invention.

Also, in case that an axi-perpendicular flat surface 470 extends downward from the top of the lens as shown in FIG. 20 with its height ranging to mo more than a halfway of the lens height such that an axi-perpendicular flat surface is not formed on the bottom side part of the lens, the stand wall of the top wall can be extended on both sides of a first lens surface 471, using the same concept as in the case of FIG. 19. In this case also, in order to eliminate the inclination of the lens relative thereto to a sufficient degree, it is desirable that the height A of the surface at which the axi-perpendicular flat surface 470 and the stand wall abut against each other is at least a half or more of the height H of the lens.

Figure 21:
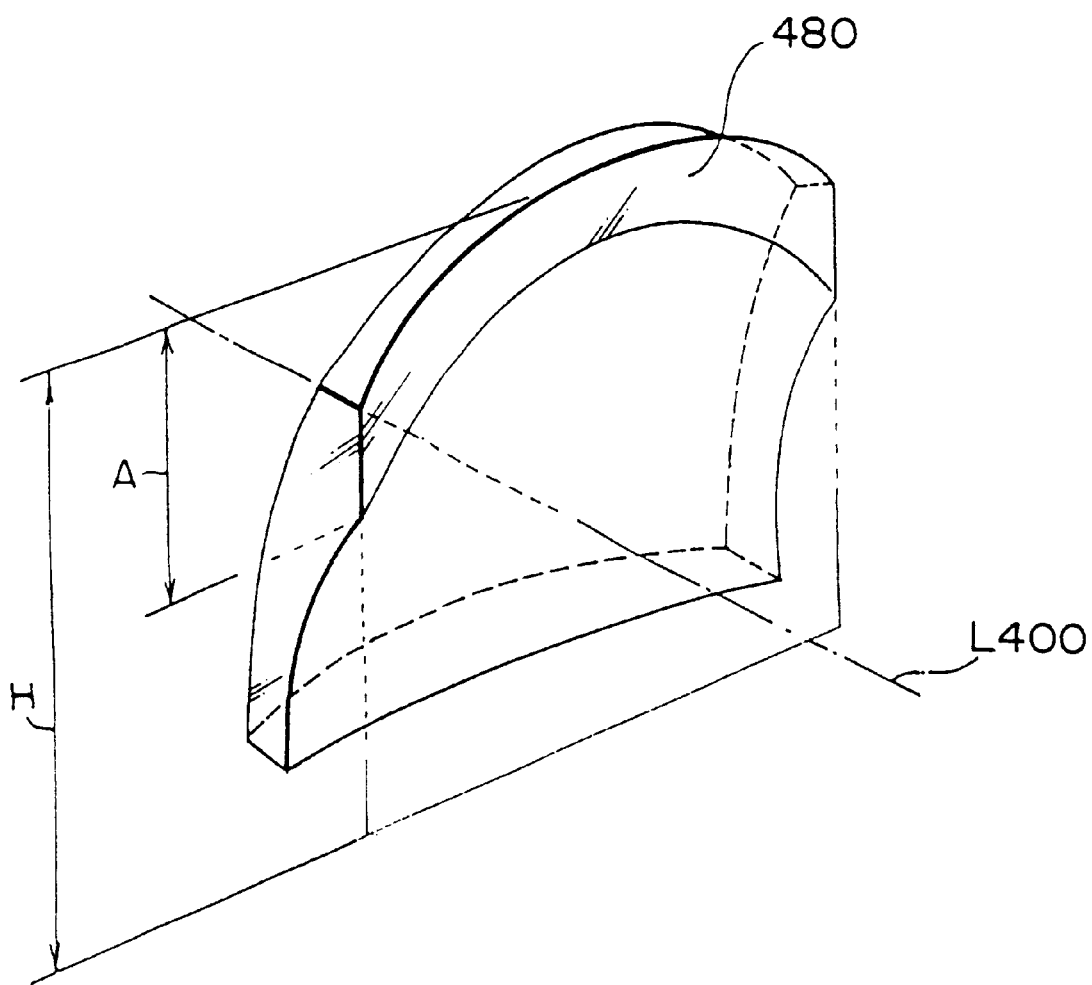
FIG. 21 is a perspective view showing a lens construction to which the lens positioning structure according to the present invention cannot apply.

By the way, in case that the distance A of an axi-perpendicular flat surface 480 is not more than a half of the size H as shown in FIG. 21, it becomes difficult to sufficiently eliminate the inclination of the lens relative thereto.

As described above, without adopting a fitting structure over the entire periphery of the lens, the parallel shift is eliminated by an abutment (partial abutment in the circumferential direction) structure between the circumferential surface of the top wall 424 of the lens holding frame and the circumferential edge surface 416 of the lens 410.

On the other hand, the inclination of the lens relative thereto is eliminated by a structure in which the axi-perpendicular flat surface 417 of the lens 410 is made to abut against the stand walls 425 of the bottom wall 423 and the stand wall 426 of the top wall 424, and by a structure the lens is pinched by the screw between the screw and the stand walls.

By the way, a manufacturing process for making the noncircular lens holding frame used in the entire-periphery fitting structure, is more complex than a manufacturing process for making the circular lens holding frame used in the entire-periphery fitting structure. If, however, it is possible to position the lens relative to the lens holding frame without using such a entire-periphery fitting structure, the manufacturing process can be simplified.

Although the present invention has been fully described in connection with the preferred embodiments thereof with reference to the accompanying drawings, it is to be noted that various changes and modifications are also apparent to those skilled in the art. Such changes and modifications are to be understood as included within the scope of the present invention as defined by the appended claims unless they depart therefrom.

What is claimed is:

1. A structure for connecting a plurality of optical element frames to each other, each of which holds a noncircular optical element, comprising:

a first optical element frame which has a first coupling part with a first connecting surface being perpendicular to a centering axis of a first noncircular optical element that is held by the first optical element frame;

a second optical element frame which has a second coupling part with a second connecting surface being perpendicular to the centering axis of the first noncircular optical element, in which the first connecting surface and the second connecting surface contact with each other; and, a rotation prohibiting mechanism by which the first coupling part and the second coupling part are prevented from rotating relative to each other around the centering axis which is perpendicular to both the first and second connecting surfaces.

2. The structure as claimed in claim 1, further comprising:

a pin which is provided on one of the first coupling part and the second coupling part; and a hole, into which the pin is inserted to lock the first coupling part and the second coupling part to each other, which is provided on the other of the first coupling part and the second coupling part.

3. The structure as claimed in claim 1, further comprising a light flux restricting member which is provided between the first optical element frame and the second optical element frame, wherein one of a pair of ends of the light flux restricting member is fixed to one of the first optical element frame and the second optical element frame, the other of the pair of ends of the light flux restricting member is fixed to the other of the first optical element frame and the second optical element frame, and wherein the light flux restricting member is perpendicular to an optical axis between the first noncircular optical element and the second noncircular optical element.

4. A structure for connecting a plurality of optical element frames to each other, each of which holds a noncircular optical element, comprising:

a first optical element frame which holds a first noncircular optical element with a first centering axis thereof and which has a first edge surface that is perpendicular to the first centering axis;

a second optical element frame which holds a second noncircular optical element with a second centering axis thereof and which has a second edge surface that is perpendicular to the second centering axis; and a spacer, which is provided between the first edge surface of the first optical element frame and the second edge surface of the second optical element frame, a pair of surfaces, facing the first and second edge surfaces, of which are inclined to each other at a predetermined angle which corresponds to an inclination angle between the first centering axis and the second centering axis, wherein the spacer is so connected between the first optical element frame and the second optical element frame that the spacer is prevented from rotating relative to the first optical element frame around the first centering axis thereof, that the spacer is prevented from rotating relative to the second optical element frame around the second centering axis thereof.

5. The structure as claimed in claim 4, wherein the spacer comprises a light flux restricting member which is held thereby, and wherein the light flux restricting member is perpendicular to an optical axis between the first noncircular optical element and the second noncircular optical element.

6. A structure for connecting a plurality of optical element frames each of which holds a noncircular optical element in which a plurality of centering axes of the noncircular optical elements are inclined to each other, comprising:

a first optical element frame which holds a first noncircular optical element and which has a first edge surface; and a second optical element frame which holds a second noncircular optical element and which has a second edge surface, wherein the first edge surface and second edge surface are perpendicular to an optical axis between the first noncircular optical element and the second noncircular optical element, and wherein there is provided a light flux restricting member between the first edge surface of the first optical element frame and the second edge surface of the second optical element frame.

\* \* \* \* \*

UNITED STATES PATENT AND TRADEMARK OFFICE
CERTIFICATE OF CORRECTION

PATENT NO. : 6,084,725
DATED : July 04, 2000
INVENTOR(S) : Masaru MIYAMOTO, et al.

It is certified that error appears in the above-identified patent and that said Letter Patent is hereby corrected as shown below:

On the Title page:

Section [73], change the Assignee from "Minolta Company, Ltd." to --Minolta Co., Ltd.--.

Signed and Sealed this

Tenth Day of April, 2001

*Attest:*

NICHOLAS P. GODICI

*Attesting Officer*    *Acting Director of the United States Patent and Trademark Office*